US008090956B2

(12) United States Patent
Asai et al.

(10) Patent No.: US 8,090,956 B2
(45) Date of Patent: Jan. 3, 2012

(54) PROGRAM CONVERTING DEVICE, SECURE PROCESSING DEVICE, COMPUTER PROGRAM, AND RECORDING MEDIUM

(75) Inventors: Rieko Asai, Osaka (JP); Taichi Sato, Osaka (JP); Tomoyuki Haga, Nara (JP); Kenichi Matsumoto, Nara (JP); Akito Monden, Nara (JP); Masahide Nakamura, Nara (JP)

(73) Assignees: Panasonic Corporation, Osaka (JP); Nara Institute of Science and Technology, Nara (JP)

( * ) Notice: Subject to any disclaimer, the term of this patent is extended or adjusted under 35 U.S.C. 154(b) by 979 days.

(21) Appl. No.: 11/886,576

(22) PCT Filed: Mar. 27, 2006

(86) PCT No.: PCT/JP2006/306123
§ 371 (c)(1),
(2), (4) Date: Sep. 18, 2007

(87) PCT Pub. No.: WO2006/101227
PCT Pub. Date: Sep. 28, 2006

(65) Prior Publication Data
US 2009/0055657 A1 Feb. 26, 2009

(30) Foreign Application Priority Data
Mar. 25, 2005 (JP) .................................. 2005-089941

(51) Int. Cl.
*G06F 12/14* (2006.01)
(52) U.S. Cl. ........ 713/189; 713/190; 713/191; 713/192; 713/193; 713/194; 726/26

(58) Field of Classification Search .......... 713/189–194; 726/26
See application file for complete search history.

(56) References Cited

U.S. PATENT DOCUMENTS
5,623,546 A * 4/1997 Hardy et al. .................. 713/193
(Continued)

FOREIGN PATENT DOCUMENTS
JP 2002-536911 10/2002
(Continued)

OTHER PUBLICATIONS
International Search Report of International Application of PCT/JP2006/306123 dated Jun. 27, 2006.

*Primary Examiner* — Nabil El Hady
(74) *Attorney, Agent, or Firm* — Wenderoth, Lind & Ponack, L.L.P.

(57) ABSTRACT

To provide a program conversion device capable of executing a program that includes a secret operation using secret information without exposure of the secret information in a memory. In an execution program generation device, with respect to an original program that includes the secret operation, a combining function generation unit generates combining function processing for applying a bitwise self-dual function to an input value, a split secret information generation unit generates pieces of split secret information by performing an inverse operation of the self-dual function, a program conversion unit generates pieces of split secret operation processing each for performing the operation between each bit value of the operand information and a corresponding bit value of a different piece of the split secret information, and replaces the secret operation processing with the pieces of the split secret operation processing and the combining function processing.

15 Claims, 10 Drawing Sheets

U.S. PATENT DOCUMENTS

| | | | |
|---|---|---|---|
| 5,826,011 A * | 10/1998 | Chou et al. | 726/31 |
| 6,052,780 A * | 4/2000 | Glover | 713/193 |
| 6,594,761 B1 * | 7/2003 | Chow et al. | 713/190 |
| 6,658,569 B1 | 12/2003 | Patarin et al. | |
| 7,228,423 B2 | 6/2007 | Asai et al. | |
| 7,231,518 B1 * | 6/2007 | Bakke | 713/168 |
| 7,346,160 B2 * | 3/2008 | Michaelsen | 380/28 |
| 2002/0062451 A1 * | 5/2002 | Scheidt et al. | 713/201 |
| 2004/0208316 A1 * | 10/2004 | Wack et al. | 380/44 |
| 2005/0050355 A1 * | 3/2005 | Graunke | 713/201 |

FOREIGN PATENT DOCUMENTS

| | | |
|---|---|---|
| JP | 2005-18725 | 1/2005 |
| JP | 2005-49925 | 2/2005 |

\* cited by examiner

FIG. 3 f(x, y, z)=x&y|y&z|z&x    (401)

| x | y | z | f(x, y, z) |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 1 | 0 | 1 |
| 1 | 0 | 1 | 1 |
| 1 | 1 | 1 | 1 |

FIG. 4 f(x, y, z)=~x&~y&z|~x&y&~z|x&~y&z|x&y&z    (421)

| x | y | z | f(x, y, z) |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 0 |
| 1 | 1 | 0 | 0 |
| 1 | 0 | 1 | 1 |
| 1 | 1 | 1 | 1 |

FIG. 5

$$f(x, y, z) = (\sim x \& \sim y) \mid (\sim y \& \sim z) \mid (\sim z \& \sim x) \quad (441)$$

442

| x | y | z | f(x, y, z) |
|---|---|---|---|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 1 | 0 | 0 |
| 1 | 0 | 1 | 0 |
| 1 | 1 | 1 | 0 |

PROGRAM CONVERTING DEVICE, SECURE PROCESSING DEVICE, COMPUTER PROGRAM, AND RECORDING MEDIUM

TECHNICAL FIELD

The present invention relates to an art for improving confidentiality in execution of a program handling secret information on a computer system.

BACKGROUND ART

Recently, functions of program analysis tools relating to computer systems such as a debugger and an ICE (In-Circuit Emulator, registered trademark) have been improved. Analysis and tampering of programs using these tools have become easier.

Arts for enhancing confidentiality protection have been proposed. In one art for example, a program is split into pieces, the pieces are encrypted, and only a necessary portion of the encrypted pieces is decrypted and executed. This makes collection of plain text programs and analysis of the program difficult. Also, in another art as disclosed in Japanese Patent Application Publication No. 2002-536911, an encryption calculation is split into pieces such that the pieces are executed in parallel to make analysis difficult.

SUMMARY OF THE INVENTION

Problems the Invention is Going to Solve

However, even if a program for decrypting encrypted data using secret information is split into pieces and the pieces are encrypted as described above, the program is restored when the program is executed. This results in exposure of the secret information such as a decryption key in a memory during execution of the program, and therefore the secret information being exposed in the memory might be acquired using an analysis tool.

In view of the above problem, the present invention aims to provide a program conversion device that executes a program for decrypting encrypted data using secret information without exposure of the secret information in a memory thereby to improve confidentiality in execution of the program.

Means to Solve the Problems

In order to solve the above problem, the present invention provides a program conversion device comprising: a program storage unit operable to store therein an original program that includes a secret operation instruction to perform a secret operation using secret information on operand information; a split secret information generation unit operable to generate pieces of split secret information based on the secret information and a predetermined combining operation, such that the secret information is acquired by performing the combining operation on the pieces of the split secret information; a split secret operation instruction generation unit operable to generate, for each of the pieces of the split secret information, a split secret operation instruction to perform a split secret operation using the operand information and the piece of the split secret information; a combining instruction generation unit operable to generate a combining instruction to combine results of the split secret operation using the combining operation, such that a result that is the same as a result of the secret operation is acquired; and a replacement unit operable to replace the secret operation instruction included in the original program with the split secret operation instruction and the combining instruction.

EFFECT OF THE INVENTION

With the above structure, the program conversion device of the present invention can use, for the secret operation in the original program, the pieces of the split secret information instead of the secret information, and generate a program having an execution result that is the same as an execution result of the original program.

Accordingly, if the generated program is executed on a computer system, the secret information is not exposed in a memory. Leakage of the secret information can be prevented thereby to improve confidentiality of the program.

Also, even if one of the pieces of the split secret information and the secret information happen to have a same value, the split secret operation performed for the one of the pieces of the split secret information is also performed for the other pieces of the split secret information. This can make it difficult to find that the one of the pieces of the split secret information and the secret information have the same value.

Also, the combining operation may be a bitwise operation using a self-dual function.

Also, the combining operation may be an operation that outputs 0 if all input bit values are 0, and outputs 1 if all the input bit values are 1.

With the above structure, the program conversion device of the present invention can use, for the secret operation in the original program, the pieces of the split secret information instead of the secret information, and generate a program having an execution result that is the same as an execution result of the original program.

Accordingly, if the generated program is executed on a computer system, the secret information is not exposed in a memory. Therefore, leakage of the secret information can be prevented thereby to improve confidentiality of the program.

Also, even if one of the pieces of the split secret information and the secret information happen to have a same value, the split secret operation performed for the one of the pieces of the split secret information is also performed for the other pieces of the split secret information. This can make it difficult to find that the one of the pieces of the split secret information and the secret information have the same value.

Here, the self-dual function is an n-variable input function $f(x_1, x_2, \ldots, x_n)$ with n variables $x_1, x_2, \ldots, x_n$ as inputs (where n is a natural number no less than 2), and satisfies $\sim f(x_1, x_2, \ldots, x_n) = f(\sim x_1, \sim x_2, \ldots, \sim x_n)$. That is, if all the values given to the function f are negated (NOT), an output is negation (NOT) of an output value corresponding to an original input value. Note that a sign "$\sim$" represents negation. Also, the self-dual function satisfies conditions $f(0, 0, \ldots, 0) = 0$ and $f(1, 1, \ldots, 1) = 1$.

Also, the secret operation may be a bitwise logical operation, the split secret operation may be the same as the secret operation, and the combining instruction may be an instruction to perform an operation that is the same as the combining operation.

With the above structure, the program conversion device of the present invention can use, for the bitwise logical operation that is the secret operation in the original program, the pieces of the split secret information instead of the secret information, and generate a program having an execution result that is the same as an execution result of the original program.

Also, the secret operation may be performed between each bit value of the operand information and a corresponding bit value of the secret information that is in the same bit position as the bit value of the operand information, the split secret information generation unit may generate, for each bit value of the secret information, bit values that are results of an inverse operation of the self-dual function applied to the bit value, and allocate each of the generated bit values to a same bit position of a piece of the split secret information in one to one correspondence, the split secret operation may be performed between each bit value of the operand information and a corresponding bit value of a different piece of the split secret information that is in the same bit position as the bit value of the operand information, and the combining instruction may be an instruction to apply the self-dual function to bit values that are results of the split secret operation so as to acquire bit values as results of the combining operation for each bit position.

With the above structure, the program conversion device of the present invention can use, for the bitwise logical operation that is the secret operation in the original program, the pieces of the split secret information instead of the secret information, and generate a program having an execution result that is the same as an execution result of the original program.

Here, the inverse operation of the self-dual function is an operation that calculates and outputs $x1, x2, \ldots, xn$ that satisfies $X=f(x1, x2, \ldots, xn)$, where X is an operation target. Also, if there are a plurality of groups of $(x1, x2, \ldots, xn)$ that satisfy $X=f(x1, x2, \ldots, xn)$, any one of the groups is selected at random.

Also, the self-dual function may be a majority function that outputs, from among a plurality of input values, an input value that is in a majority of the plurality of the input values, the split secret information generation unit may prestore therein a correspondence table between input values relating to the self-dual function and an output value, and read, for each bit position of the secret information, input values corresponding to an output value that is the same as a bit value in the bit position of the secret information from the correspondence table, and allocate each of the read input values to a piece of the split secret information in a same bit position in one to one correspondence.

With the above structure, if a result value of a majority decision has been known, the split secret information generation unit can determine a plurality of values such that a result of the majority decision becomes the same as the result value that has been known. Also, each of the plurality of the determined values is allocated to a piece of the split secret information in the same bit position in one to one correspondence. Therefore, the split secret information generation unit can generate pieces of split secret information that are difficult to be estimated based on the secret information.

Also, an operation storage unit that may store therein a plurality of different self-dual functions, wherein the split secret information generation unit may perform, as the combining operation, at-random selection of one of the self-dual functions stored in the operation storage unit.

With the above structure, the program conversion device can generate a program using selected one of the plurality of the self-dual functions. This can make malicious analysis more difficult thereby to improve confidentiality of the program.

Also, the replacement unit may further rearrange locations of the split secret operation instruction and the combining instruction without having influence on an execution result of the program.

Also, the replacement unit may further scatter the rearranged locations of the split secret operation instruction and the combining instruction without having influence on the execution result of the program.

Also, the replacement unit may further add a dummy operation instruction to the program without having influence on the execution result of the program.

With the above structure, the program conversion device of the present invention generates a program in which locations of processing are scattered to a plurality of parts, compared with a part where the secret operation is performed in the original program This can make malicious analysis more difficult to be performed thereby to improve confidentiality of the program.

A program conversion method of the present invention is a program conversion method for converting an original program that includes a secret operation instruction to perform a secret operation using secret information on operand information, the program conversion method comprising: a split secret information generation step for generating pieces of split secret information based on the secret information and a predetermined combining operation, such that the secret information is acquired by performing the combining operation on the pieces of the split secret information; a split secret operation instruction generation step for generating, for each of the pieces of the split secret information, a split secret operation instruction to perform a split secret operation using the operand information and the piece of the split secret information; a combining instruction generation step for generating a combining instruction to combine results of the split secret operation using the combining operation, such that a result that is the same as a result of the secret operation is acquired; and a replacement step for replacing the secret operation instruction included in the original program with the split secret operation instruction and the combining instruction.

A computer program of the present invention is a computer program for use in a program conversion device for converting an original program that includes a secret operation instruction to perform a secret operation using secret information on operand information, the computer program comprising: a split secret information generation step for generating pieces of split secret information based on the secret information and a predetermined combining operation, such that the secret information is acquired by performing the combining operation on the pieces of the split secret information; a split secret operation instruction generation step for generating, for each of the pieces of the split secret information, a split secret operation instruction to perform a split secret operation using the operand information and the piece of the split secret information; a combining instruction generation step for generating a combining instruction to combine results of the split secret operation using the combining operation, such that a result that is the same as a result of the secret operation is acquired; and a replacement step for replacing the secret operation instruction included in the original program with the split secret operation instruction and the combining instruction.

An integrated circuit of the present invention is an integrated circuit for use in a program conversion device for converting an original program that includes a secret operation instruction to perform a secret operation using secret information on operand information, the integrated circuit comprising: a split secret information generation unit operable to generate pieces of split secret information based on the secret information and a predetermined combining operation, such that the secret information is acquired by performing the combining operation on the pieces of the split secret information; a split secret operation instruction generation unit operable to generate, for each of the pieces of the split secret information, a split secret operation instruction to perform a split secret operation using the operand information and the piece of the split secret information; a combining instruction generation unit operable to generate a combining instruction to combine results of the split secret operation using the combining operation, such that a result that is the same as a result of the secret operation is acquired; and a replacement unit operable to replace the secret operation instruction included in the original program with the split secret operation instruction and the combining instruction.

A recording medium of the present invention is a computer readable storage medium that stores therein a computer program for use in a program conversion device for converting an original program that includes a secret operation instruction to perform a secret operation using secret information on operand information, the computer program comprising: a split secret information generation step for generating pieces of split secret information based on the secret information and a predetermined combining operation, such that the secret information is acquired by performing the combining operation on the pieces of the split secret information; a split secret operation instruction generation step for generating, for each of the pieces of the split secret information, a split secret operation instruction to perform a split secret operation using the operand information and the piece of the split secret information; a combining instruction generation step for generating a combining instruction to combine results of the split secret operation using the combining operation, such that a result that is the same as a result of the secret operation is acquired; and a replacement step for replacing the secret operation instruction included in the original program with the split secret operation instruction and the combining instruction.

With the above structure, the program conversion device of the present invention can use, for the secret operation in the original program, the pieces of the split secret information instead of the secret information, and generate a program having an execution result that is the same as an execution result of the original program.

Accordingly, if the generated program is executed on a computer system, the secret information is not exposed in a memory. Therefore, leakage of the secret information can be prevented thereby to improve confidentiality of the program.

Also, even if one of the pieces of the split secret information and the secret information happen to have the same value, an operation performed on the one of the pieces of the split secret information is also performed on the other pieces of the split secret information. This can make it difficult to find that the one of the pieces of the split secret information and the secret information have the same value.

A secure processing device of the present invention is a secure processing device comprising: an operand information storage unit operable to store therein operand information; a split secret information storage unit operable to store therein pieces of split secret information; a combining operation expression storage unit operable to store therein a combining operation expression showing a combining operation for combining the pieces of the split secret information; a split secret operation unit operable to perform, for each piece of the split secret information, a split secret operation as a first operation on the operand information using the piece of the split secret information; and a combining unit operable to combine results of the split secret operation using the combining operation, wherein the combining unit combines the results of the split secret operation using the combining operation, such that a result as a combination of the results is the same as a result of a second operation performed on the operand information using secret information, such that the secret information is acquired by combining the pieces of the split secret information using the combining operation.

A computer program of the present invention is a computer program that includes operand information, pieces of split secret information, and a combining operation expression for combining the pieces of the split secret information, the computer program comprising: a split secret operation step for performing, for each piece of the split secret information, a split secret operation as a first operation on the operand information using the piece of the split secret information; and a combining step for combining results of the split secret operation using the combining operation, wherein in the combining step, the results of the split secret operation are combined using the combining operation, such that a result as a combination of the results is the same as a result of a second operation performed on the operand information using secret information, such that the secret information is acquired by combining the pieces of the split secret information using the combining operation.

Also, the first operation may be the same as the second operation.

With the above structure, by performing the split secret operations using the pieces of the split secret information instead of performing the secret operation using the secret information, the program conversion device of the present invention can acquire an execution result that is the same as an execution result of the operation using the secret information.

Accordingly, if the generated program is executed on a computer system, the secret information is not exposed in a memory. Therefore, leakage of the secret information can be prevented thereby to improve confidentiality of the program.

Also, even if one of the pieces of the split secret information and the secret information happen to have a same value, the split secret operation performed for the one of the pieces of the split secret information is also performed for the other pieces of the split secret information. This can make it difficult to find that the one piece of the split secret information and the secret information have the same value.

BRIEF DESCRIPTION OF THE DRAWINGS

FIG. 3 shows an example of a self-dual function;

FIG. 4 shows an example of the self-dual function;

FIG. 5 shows an example of the self-dual function;

DESCRIPTION OF CHARACTERS

Figure 1:
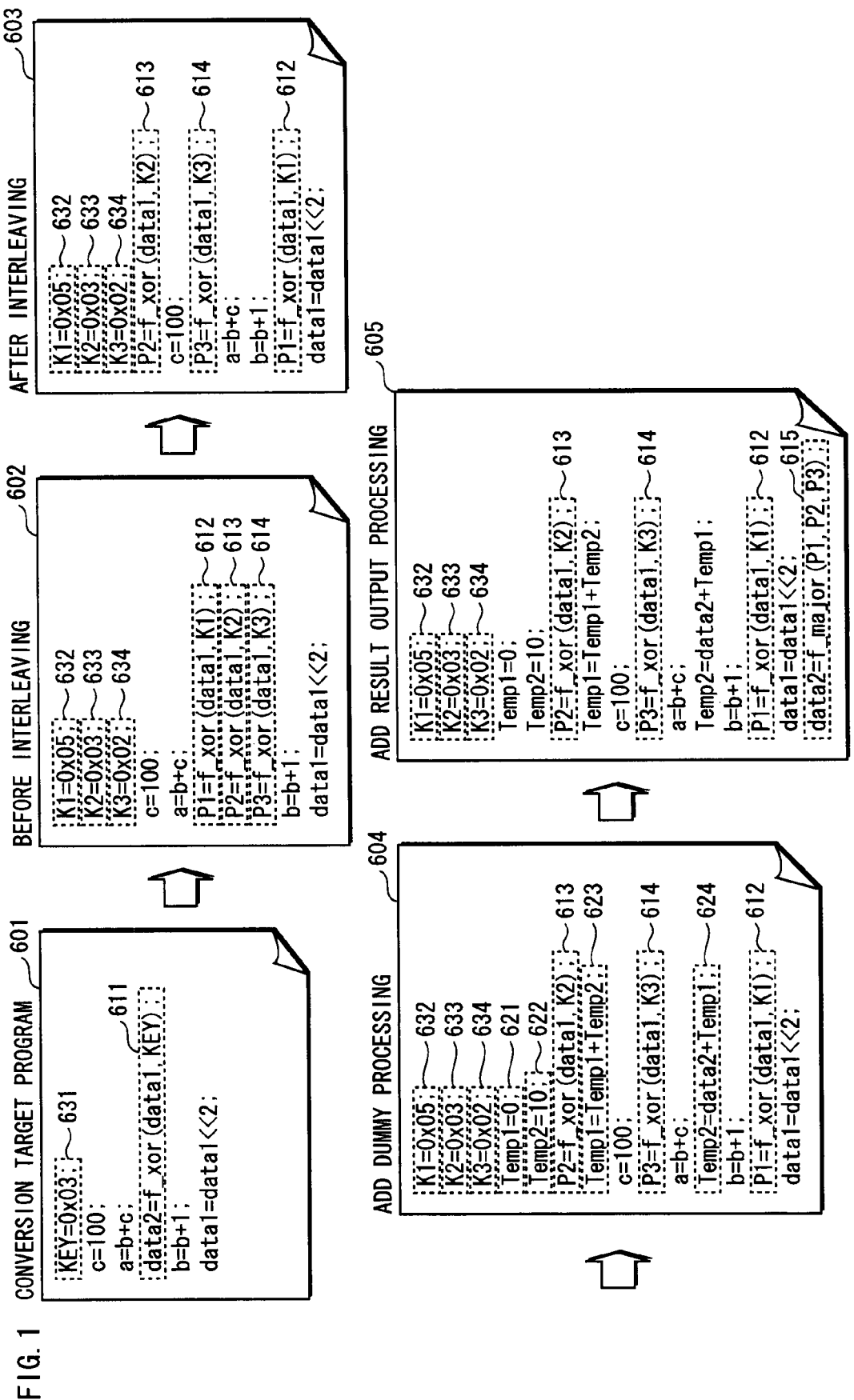
FIG. 1 shows an example of a program handled by a program conversion device of the present invention.

10: execution program generation device
11: input unit

12: program storage unit
13: converted program generation unit
14: execution program generation unit
101: secret operation designation unit
102: split secret information generation unit
103: program acquisition unit
104: split number designation unit
105: combining function storage unit
106: program conversion unit
107: combining function generation unit
1101: secret operation designation unit
1107: combining function generation unit
1106: program conversion unit
1300: converted program generation unit

DETAILED DESCRIPTION OF THE INVENTION

First Embodiment

Outline

An execution program generation device according to an embodiment of the present invention generates an execution program that is difficult to be maliciously analyzed, in the following way for example. For this purpose, the execution program generation device performs conversion processing for improving confidentiality on a user-created program including processing which requires confidentiality such as processing for decrypting encrypted data using a decryption key, such that the decryption key is not exposed in a memory during execution of the program, and then compiles the program.

The user-created program is for example a player program for decrypting a content such as encrypted music data and video data using a decryption key that is secret information so as to play back the decrypted content. Such a program is created based on specifications of a given programming language such as the C language, like a program 601 shown in FIG. 1.

In the following description, the program 601 is used as an example.

The program 601 is a text composed of a plurality of lines. Hereinafter, each of the lines of the text is referred to as a "code".

The program 601 handles secret information, and includes a code 611 "data2=f_xor(data1, KEY);" which requires confidentiality. The code 611 is an example of an operation for decrypting the whole or part of the above-mentioned encrypted data to store a decryption result.

"data1" is a variable, and is data to be decrypted.

"KEY" is a constant embedded in the program, and is a decryption key for decrypting the data.

A function f_xor (A, B) is a function that allocates an exclusive OR (XOR) of each bit value of an 8-bit argument A and a corresponding bit value of an 8-bit argument B that is in the same bit position as the same as the bit value of the argument A to the same bit position of a return value. Here, the 8 bits are referred to as "bit 0, bit 1, bit 2, . . . bit 7" in order from the least significant bit. A value of a j-th bit of a variable X is described as X:j. Also, hereinafter a number given in hexadecimal form is described as 0xY, for example. 0x represents that the number is given in hexadecimal form. A number 0xF represents 15 given in decimal form, and a number 0xFF represents 255 given in decimal form.

Specifically, in the function f_xor(A, B), an XOR is calculated between bit values in bit 0 of the arguments A and B, and a calculation result is allocated to bit 0 of a return value. An XOR is calculated between bit values in bit 1 of the arguments A and B, and a calculation result is allocated to bit 1 of the return value. The same processing is performed on bit values in bit 2 to bit 7 of the arguments A and B. In this way, an 8-bit return value is acquired. For example, if data1=0x03 and KEY=0x03, a return value of f_xor(data1, KEY) is 0x00.

Here, the function f_xor (A, B) independently performs, for each bit position, an XOR between bit values in the same bit position of the arguments A and B.

Accordingly, the arguments A and B each may be, for example, a 1024-bit, a 2048-bit, or the like, other than an 8-bit. In this case, calculation results of an XOR between each bit value in the same bit position of the arguments A and B such as 1024-bits, 2048-bits are combined. Also, if the arguments A and B have a 1-bit length, that is, if both data1 and KEY each have a 1-bit length, the code 611 is the same as "data2=data1^KEY;". Here, a sign "^" is an operator that represents an XOR.

Also, if the arguments A and B each have a 2-bit length, data2=f_xor(data1, KEY) is the same as processing that is performed in accordance with the following two expressions written in the program 601, "data2:1=data1:1^KEY:1;", and "data2:0=data1:0^KEY:0;".

If the program 601 is compiled without being converted into a converted program to generate an execution program and the generated execution program is executed on a computer, a decryption key KEY is exposed in the memory during execution of processing corresponding to the code 611 of the execution program on the computer. Accordingly, if data in the memory is analyzed during the execution of the execution program using an analysis tool such as a debugger and an ICE (In-Circuit Emulator, registered trademark), an immediate value of the decryption key KEY can be maliciously acquired.

The execution program generation device of the present invention firstly generates, for example, a program 605 shown in FIG. 1 from the program 601, and then compiles the program, 605 to generate an execution program.

The program 605 is described in detail later. The code 611 in the program 601 is split into a plurality of codes 612 to 615 in the program 605. If the codes 612 to 615 are executed, processing that is the same as processing of the code 611 is performed.

A program from which a user-created program has been converted to perform processing that is the same as processing performed by the user-created program is referred to as a "converted program". The above-mentioned program 605 is a converted program.

Also, if an execution program generated from the program 605 is executed on the computer, a result that is the same as a result of an operation using the decryption key KEY can be acquired without exposure of an immediate value of the decryption key KEY in the memory. Therefore, the key can be prevented from being easily revealed by malicious analysis.

<Structure>

The following describes an execution program generation device 10 as an embodiment of the present invention with reference to the drawings.

Figure 2:
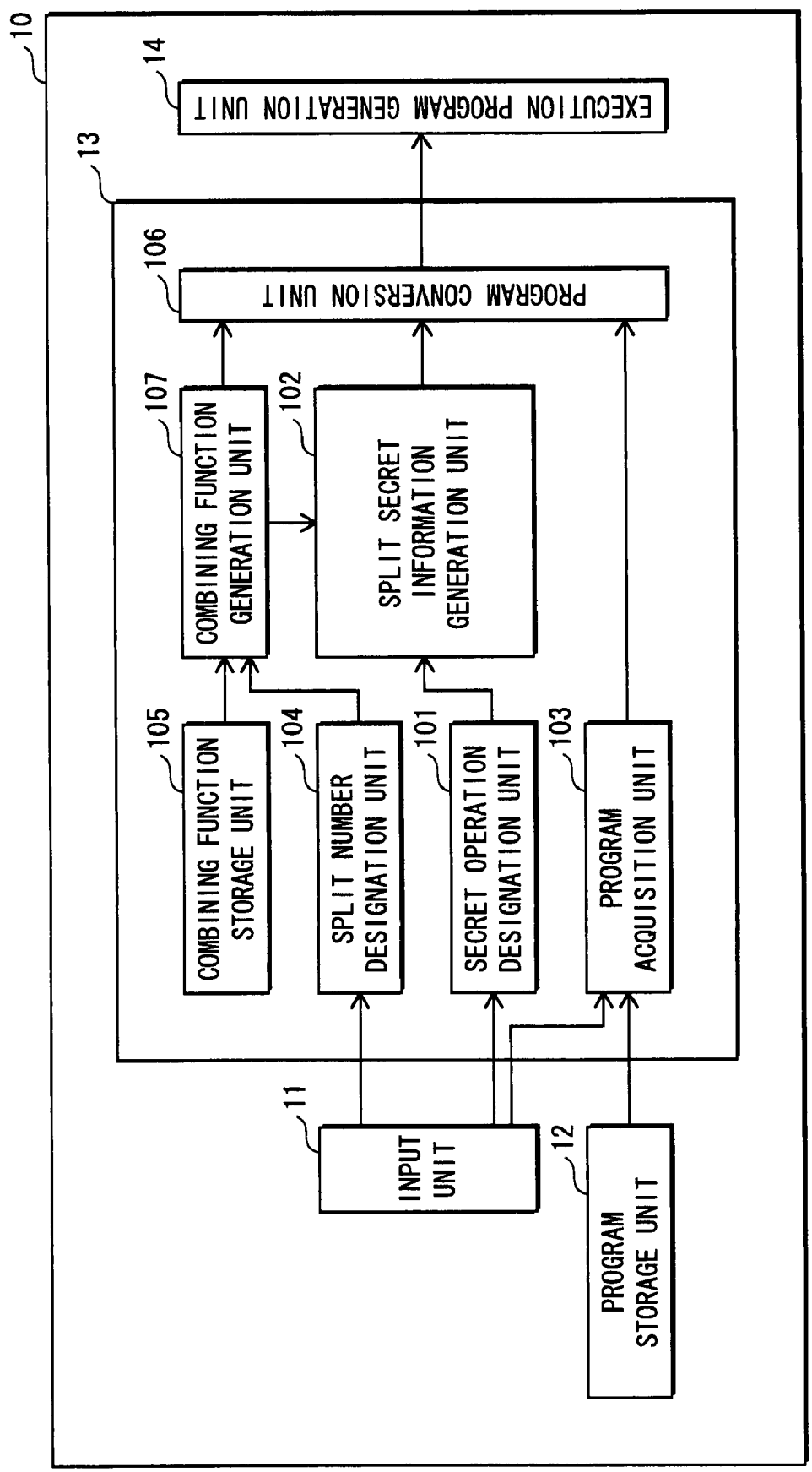
FIG. 2 is a block diagram showing an internal structure of an execution program generation device according to an embodiment of the present invention.

The execution program generation device 10 includes, as shown in FIG. 2, an input unit 11, a program storage unit 12, a converted program generation unit 13, and an execution program generation unit 14.

The execution program generation device 10 is specifically a computer system composed of a microprocessor, a ROM, a RAM, a hard disk unit, a display unit, a keyboard, a mouse, and so on. A computer program is stored in the RAM or the hard disk unit. Functions of the execution program generation device 10 are achieved by the microprocessor operating in accordance with the computer program.

(Input Unit 11, Program Storage Unit 12, and Execution Program Generation Unit 14)

The input unit 11 receives an instruction to the execution program generation device 10 that is input by a user using an input device such as the keyboard and a mouse (not shown in the figure), and outputs the instruction to a processing unit corresponding to a content of the instruction.

The program storage unit 12 is a storage device such as a hard disk, and stores therein programs created by the user. For example, the program storage unit 12 stores therein the program 601.

The execution program generation unit 14 is composed of a CPU and a compiler, and converts a converted program generated by the converted program generation unit 13 into a computer-executable execution program.

(Converted Program Generation Unit 13)

The converted program generation unit 13 is composed of a CPU and its control program, and converts a program created by the user into a converted program.

The converted program generation unit 13 includes, as shown in FIG. 2, a secret operation designation unit 101, a split secret information generation unit 102, a program acquisition unit 103, a split number designation unit 104, a combining function storage unit 105, a program conversion unit 106, and a combining function generation unit 107.

(Program Acquisition Unit 103)

Upon receiving an acquisition instruction to acquire a program to be converted from the input unit 11, the program acquisition unit 103 reads the program instructed by the acquisition instruction from the program storage unit 12, and displays the read program on a display (not shown in the drawing). Here, the acquisition instruction includes a file name of a file on which the program to be converted is recorded.

As an example, the program acquisition unit 103 receives an acquisition instruction including a file name of a file on which the program 601 is recorded from the input unit 11, reads the program 601 recorded on the file identified by the file name, and displays the read program 601 on the display.

(Secret Operation Designation Unit 101)

The secret operation designation unit 101 acquires secret specification information for specifying secret information included in a program from the input unit 11, and outputs the acquired secret specification information to the split secret information generation unit 102.

The secret specification information includes secret location information indicating a location of a code including secret information (e.g. the code 611) and the secret information.

For example, the secret location information is a line number of the code 611 in the program 601, and the secret information is "KEY".

As a specific example of a procedure for acquiring secret specification information, the user searches the program 601 displayed on the display by the program acquisition unit 103 for a code that includes secret information and of which the user hopes to improve confidentiality (e.g. the code 611), and inputs the secret specification information to the input unit 11 in order to specify the secret information. The secret operation designation unit 101 acquires the input secret specification information via the input unit 11.

(Split Number Designation Unit 104)

The split number designation unit 104 acquires a split number input by the user via the input unit 11, and outputs the acquired split number to the combining function generation unit 107.

The split number shows the number of pieces of split secret information into which the secret information is split.

Split of secret information and split secret information are described later.

(Combining Function Storage Unit 105)

The combining function storage unit 105 is a storage device such as a hard disk, and stores therein one or more combining functions.

The combining function is a function that combines a plurality of pieces of split secret information to generate secret information.

The combining function storage unit 105 stores therein a combining function f( ).

In the first embodiment, the combining function storage unit 105 stores therein a combining function f_major(P1, P2, P3) as an example of the combining function f( ).

The combining function f_major (P1, P2, P3) performs a majority operation on 8-bit arguments P1, P2, and P3 for each bit value in the same bit position, and allocates each of results of the majority operation to the same bit position of a return value.

FIG. 3 shows a function 401 as an example of the function f( ) that performs the majority operation.

The function 401 is a majority operation that outputs 1 if more than half of x, y, and z are 1, that is, two or more of x, y, and z are 1.

If three numbers x, y, and z are input, the function 401 outputs a combination result in accordance with a truth table 402 shown in FIG. 3.

For example, if x=0, y=0, and z=0 are input, the function 401 outputs 0 in accordance with the truth table 402. If x=0, y=1, and z=1 are input, the function 401 outputs 1 in accordance with the truth table 402.

For example, if P1=0x03, P2=0x03, and P3=0x02 are input, f_major(0x03, 0x03, 0x02) allocates f(1, 1, 0)=1 to a bit 0 of a return value of f_major( ) in which a value 1 in bit 0 of P1 is x, a value 1 in bit 0 of P2 is y, and a value 0 in bit 0 of P3 is z.

Likewise, f_major(0x03, 0x03, 0x02) allocates f(1, 1, 0)=1 to a bit 1 of the return value of f_major( ) in which a value 1 in bit 1 of P1 is x, a value 1 in bit 1 of P2 is y, and a value 1 in bit 1 of P3 is z. The same processing is performed for each of bit 2 to bit 7. In this way, f_major(0x03, 0x03, 0x02) acquires an 8-bit return value, and returns the acquired return value.

As well as the above-described f_xor(A, B), f_major(P1, P2, P3) independently performs, for each bit position, a majority operation among bit values in the same bit position of P1, P2, and P3. Accordingly, the arguments P1, P2, and P3 each may be for example a 1024-bit argument, a 2048-bit argument, or the like other than the 8-bit argument. In this case, calculation results of a majority operation among each bit value in the same bit position of the arguments P1, P2, and P3 such as 1024 bits and 2048 bits are combined. Also, if the arguments P1, P2, and P3 each have a 1-bit length, "data2=f_major(P1, P2, P3)" is the same as "data2=f(P1, P2, P3)".

The combining function storage unit 105 stores therein a function as a combining function, in addition to the function f_major( ).

For example, the combining function storage unit 105 stores therein a function that applies a function 421 shown in FIG. 4 for each bit position of an input argument, a function that applies a function 441 shown in FIG. 5 for each bit position of an input argument.

Here, signs "|" and "&" included in the functions 401, 421, and 441 represent a logical OR and a logical AND, respectively.

Also, FIG. 4 shows the function 421 as an example of the function f and a truth table 422 thereof. FIG. 5 shows the function 441 as an example of the function f and a truth table 442 thereof.

A sign "~" included in the functions 421 and 441 represents a logical NOT operation.

Detailed descriptions of FIG. 4 and FIG. 5 are omitted here since the descriptions overlap with the description of FIG. 3.
(Combining Function Generation Unit 107)

Upon receiving the split number from the split number designation unit 104, the combining function generation unit 107 selects at random one of combining functions appropriate for the split number among combining functions stored in the combining function storage unit 105.

If the split number is three, the combining function generation unit 107 selects a combining function with three inputs stored in the combining function storage unit 105, for example, the combining function f_major( ).

After selecting the combining function, the combining function generation unit 107 outputs, to the split secret information generation unit 102, information relating to the selected combining function and for specifying a split method of a key, for example, split method information showing a "majority decision", and the split number, and notifies the program conversion unit 106 of the selected combining function.

In the first embodiment, the combining function generation unit 107 selects at random a combining function among combining functions stored in the combining function storage unit 105. Alternatively, the combining function generation unit 107 may generate a combining function.

Note that although the combining function sorted in or generated by the combining function generation unit 107 does not need to be a function that performs a majority operation, the combining function needs to satisfy a predetermined property. The property is described in detail later, and therefore its description is omitted here.
(Split Secret Information Generation Unit 102)

The split secret information generation unit 102 receives secret specification information from the secret operation designation unit 101, receives the split method information and the split number from the combining function generation unit 107, and splits the secret information into the split number of pieces based on a split method shown by the split method information.

In the first embodiment, a split number M is three. The split method information shows a "majority decision". Also, an odd number is set as the split number M because the majority decision needs to be performed.

Based on the secret information "KEY" included in the received secret specification information, the split secret information generation unit 102 generates three pieces of split secret information K1, K2, and K3 such that a result of the majority decision is "KEY".

Figure 6:
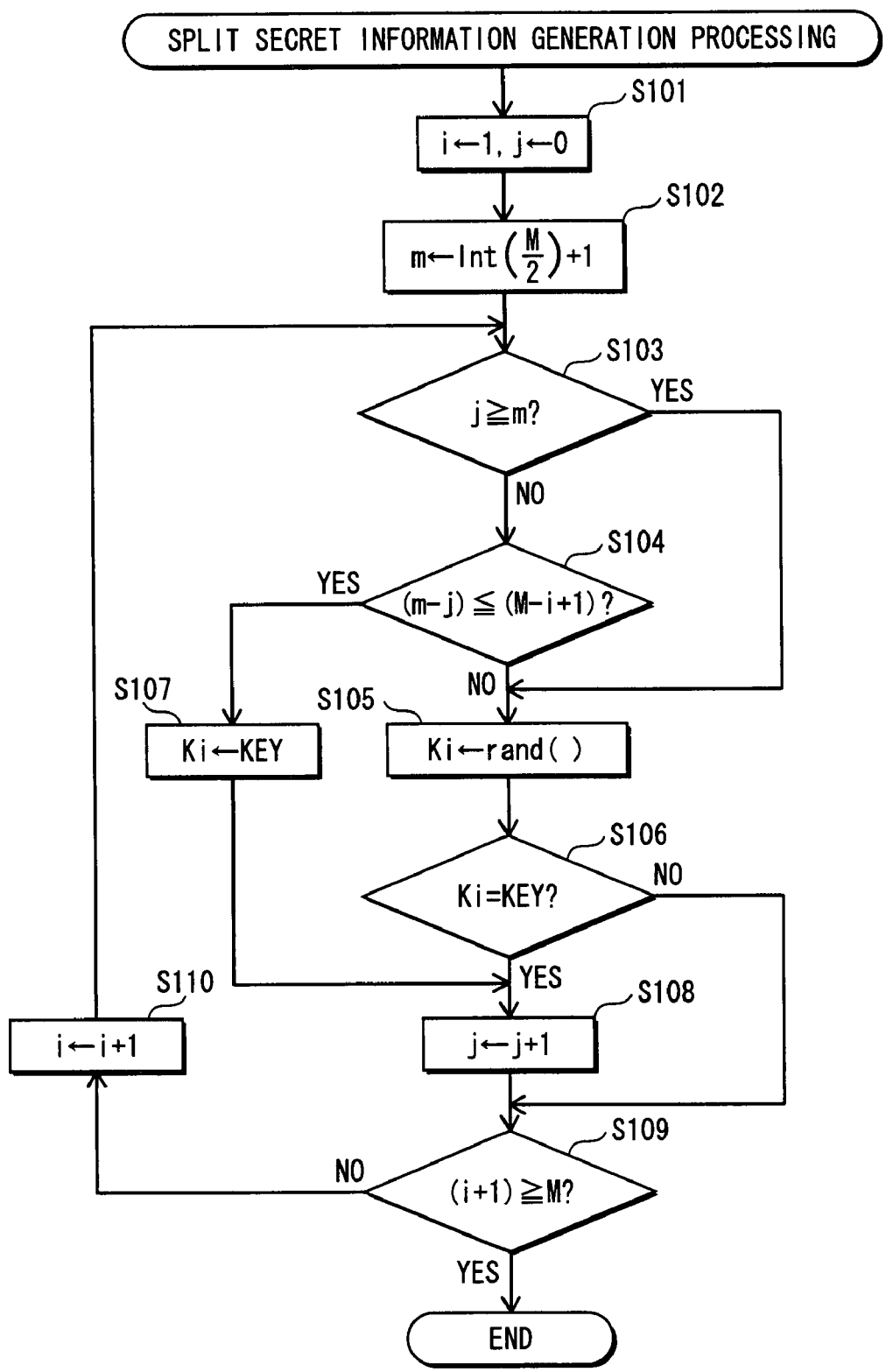
FIG. 6 is a flow chart showing split secret information generation processing.

The following describes split secret information generation processing performed by the split secret information generation unit 102, with reference to a flow chart shown in FIG. 6. Here, the flow chart shows processing performed in a case where KEY and K1 to K3 respectively have 1-bit. In a case where KEY and K1 to K3 are respectively composed of a plurality of bits, K1 to K3 respectively having a desired bit length relating to KEY having a desired bit length can be acquired by performing the processing shown in the flow chart on the bits for each bit position.

A variable i shown in FIG. 6 is a value for showing a piece of split secret information Ki that is a target of value setting.

A variable j is a value for counting the number of pieces of split secret information having a value set as the same as KEY among pieces of split secret information K1 to Ki having a value that has been already set up.

First, the split secret information generation unit 102 initializes the variable i to 1, and initializes the variable j to 0 (Step S101).

Next, with respect to the split number M, the split secret information generation unit 102 calculates a minimum number m that constitutes a majority in a majority decision. The minimum number m is calculated using an expression Int(M/2)+1. Here, Int(x) represents an integral part of x.

Then, the split secret information generation unit 102 judges whether the variable j is no less than the minimum number m (Step S103).

If the variable j is no less than the minimum number m (Step S103: YES), it is definite that a result of a majority decision among K1 to KM is KEY. Accordingly, the split secret information generation unit 102 sets a return value of a function rand( ) in Ki (Step S105).

Here, the function rand( ) returns at random either value 0 or 1, as a return value.

If the variable j is less than the minimum number m (Step S103: NO), the split secret information generation unit 102 judges whether (m−j) is no more than (M+1−i) (Step S104). Here, (m−j) is the minimum number of pieces of split secret information that each need to be set to have a value that is the same as KEY, and (M+1−i) is the number of pieces of split secret information each whose value has not been set.

If (m−j) is no more than (M+1−i) (Step S104: YES), each of all the pieces of the split secret information whose value has not been set needs to be set to have KEY. Accordingly, the split secret information generation unit 102 sets KEY in Ki (Step S107). Then, the flow proceeds to Step S108.

If (m−j) is greater than (M+1−i) (Step 104: NO), each of all the pieces of the split secret information whose value has not been set does not need to be set to have KEY. Accordingly, the flow proceeds to Step S105, and the split secret information generation unit 102 sets a random value in each piece of the split secret information.

After setting the random value in Step S105, the split secret information generation unit 102 judges whether Ki matches KEY (Step S106). If Ki does not match KEY (Step S106: NO), the flow proceeds to Step S109. If Ki matches KEY (Step S106: YES), the split secret information generation unit 102 increments the variable j by 1 (Step S108), and the flow proceeds to Step S109.

Next, the split secret information generation unit 102 judges whether (i+1) is no less than the split number M (Step S109). If (i+1) is less than the split number M (Step S109: NO), the split secret information generation unit 102 increments the variable i by 1 (Step S110), and the flow proceeds to Step S103. If (i+1) is no less than the split number M (Step S109: YES), the processing ends.

Through the above-described procedure, the split secret information generation unit 102 generates the pieces of the split secret information K1 to KM based on the secret information KEY such that a result of a majority decision among K1 to KM becomes KEY, and then outputs the generated K1 to K3 and the secret specification information to the program conversion unit 106.

(Program Conversion Unit 106)

The program conversion unit 106 acquires the secret specification information and the split number of the pieces of the split secret information from the split secret information generation unit 102, acquires a notification of a combining function from the combining function generation unit 107, acquires a program from the program acquisition unit 103, and performs the following processing on the acquired program: (a) operation split processing; (b) interleaving processing; (c) dummy addition processing; and (d) combining function addition processing.

The following describes the processing (a) to (d) in this order with reference to FIG. 1.

(a) Operation Split Processing

Operation split processing is processing for splitting a secret operation included in a program into M pieces of split secret operations.

With respect to the code 611 "data2=f_xor(data1, KEY);" in a line number included in the secret specification information in the program 601, the program conversion unit 106 generates M operations in which an operation using secret information is replaced with an operation using pieces of split secret information, i.e., generates the code 612 "P1=f_xor(data1, K1);", the code 613 "P2=f_xor(data1, K2);", and the code 614 "P3=f_xor(data1, K3);", and replaces the code 611 with the codes 612 to 614.

Also, the program conversion unit 106 replaces a code 631 "KEY=0x03;" that defines a value of KEY with a code 632 "K1=0x05;", a code 633 "K2=0x03;", and a code 634 "K3=0x02;" that respectively define values of K1, K2, and K3.

A program 602 is a program in which the code 611 has been replaced with the codes 612 to 614, and the code 631 has been replaced with the codes 632 to 634.

(b) Interleaving Processing

The program conversion unit 106 changes an arrangement of the codes in the program 602 without changing an execution result of the program.

A program 603 shown in FIG. 1 is the program 602 on which interleaving processing has been performed.

Specifically, the program conversion unit 106 arranges the codes 612 to 614 that have been replaced with the code 611 in the program 601 so as to be sandwiched (interleaved) between another codes in the program 602.

As an example, a head code in the program 603 "c=100;" is interleaved between the code 613 and the code 614. A code "a=b+c;" and a code "b=b+1;" are interleaved between the code 614 and the code 612.

Also, since the codes 612 to 614 are respectively independent codes, even if the arrangement order of these codes is changed, the execution result of the program 602 does not change. Therefore, the program conversion unit 106 changes the arrangement order of the codes 612 to 614.

However, if a code "data1=data1<<2;" is arranged anterior to the codes 612 to 614, execution results of the codes 612 to 614 are changed. Therefore, the code "data1=data1<<2;" is arranged posterior to the codes 612 to 614.

By performing this interleaving processing, locations of operation processing using the pieces of the split secret information are scattered separately in the program without gathering in one place. Therefore, the interleaving processing can make malicious analysis difficult to be performed.

(c) Dummy Addition Processing

The program conversion unit 106 adds, to the program 603 on which the interleaving processing has been performed, a code showing dummy processing that has no influence on an execution result of the program.

As an example, the program conversion unit 106 adds the following four dummy codes to the program 603, as shown in a program 604 in FIG. 1:
 a code 621 "Temp1=0;"
 a code 622 "Temp2=10;"
 a code 623 "Temp1=Temp1+Temp2;" and
 a code 624 "Temp2=data2+Temp1;".

Temp1 and Temp2 are respectively variables that have not been originally included in the program 603, and have no influence on an execution result of the program 603. Also, the codes 621 to 624 are new codes that have not been originally included in the program 603.

Although the code 624 uses data2 that has been originally included in the program 603, the data2 is used without having influence on the execution result of the program 603.

(d) Combining Function Addition Processing

The program conversion unit 106 generates the program 605 by adding a code 615 "data2=f_major(P1, P2, P3);" to the program 604. The code 615 "data2=f_major(P1, P2, P3);" gives P1 to P3 that are respectively operation results of the codes 612 to 614, to an argument of the combining function f( ) acquired from the combining function generation unit 107.

Through the processing described above, the program conversion unit 106 converts the program 601 into the program 605 that is a converted program, and outputs the converted program to the execution program generation unit 14.

<Operations>

Figure 7:
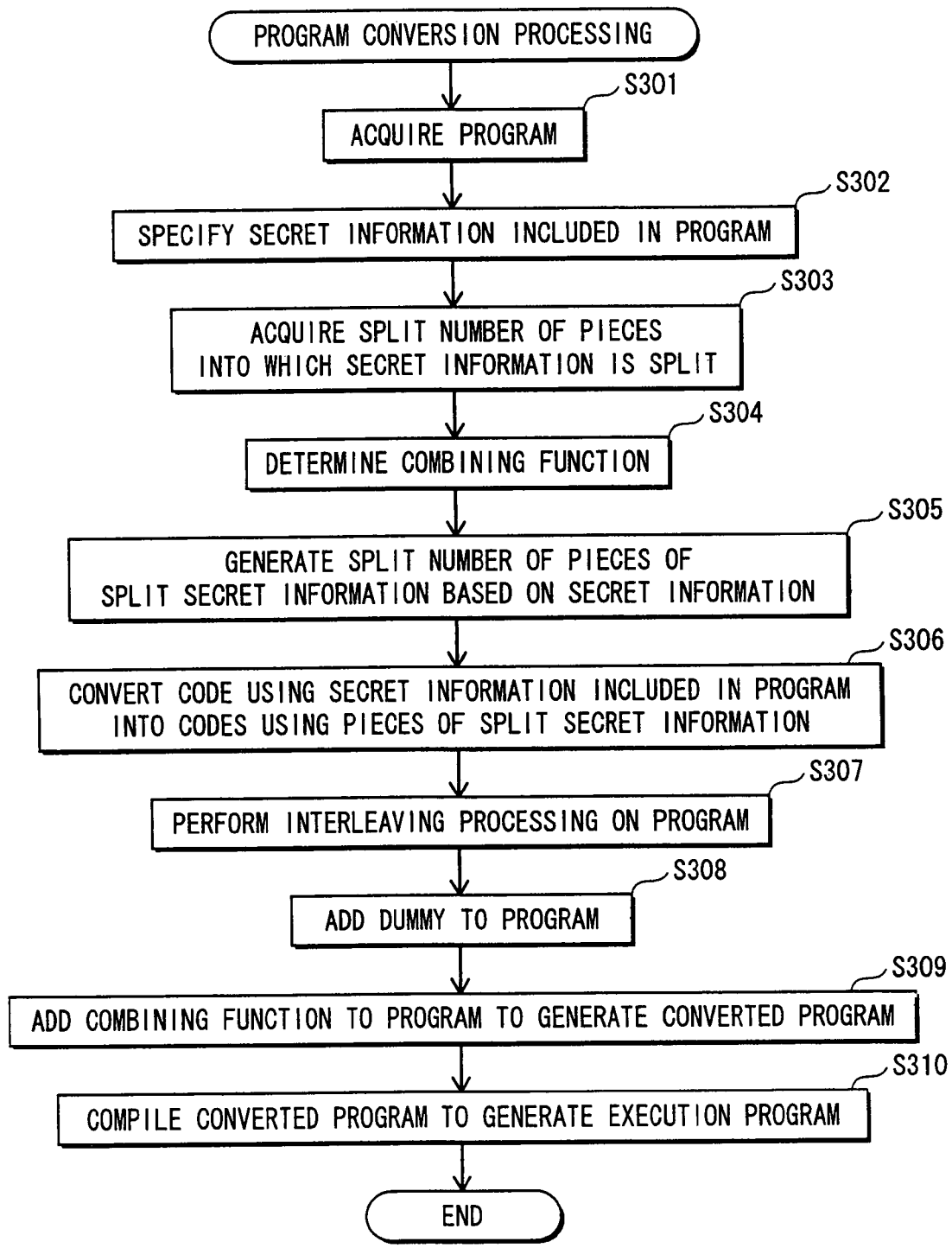
FIG. 7 is a flow chart showing program conversion processing.

The following describes operations of the execution program generation device 10, with reference to a flow chart shown in FIG. 7.

Through user operations, the user creates the program 601 including secret information and stores the program 601 as an electronic file in the program storage unit 12.

The user operates the keyboard and the like to request display of the electronic file including the program 601.

In accordance with the request, the input unit 11 transmits an acquisition instruction including a file name of the electronic file to the program acquisition unit 103 (Step S301).

The program acquisition unit 103 acquires the electronic file identified by the file name from the program storage unit 12, and displays the program 601 on the display (not shown in the drawing).

With reference to the program 601 displayed on the display, the user inputs secret specification information relating to the secret information included in the program 601 to the input unit 11 through a user operation.

The secret specification information includes a line number of the code 611 in the program 601, an operator used for a secret operation "^", and secret information "KEY".

The secret operation designation unit 101 acquires the secret specification information via the input unit 11, and transmits the acquired secret specification information to the split secret information generation unit 102 (Step S302).

Next, the user inputs a split number to the input unit 11 through a user operation. Here, the split number is three.

The split number designation unit 104 acquires the split number from the input unit 11 (Step S303), and transmits the acquired split number to the combining function generation unit 107.

The combining function generation unit 107 receives the split number, and selects one of the combining functions stored in the combining function storage unit 105 based on the split number (Step S304). The combining function generation unit 107 outputs information relating to the selected combining function and for specifying a split method of a key, for example, split method information showing a "majority decision" and the split number to the split secret information generation unit 102, and notifies the program conversion unit 107 of the selected combining function.

The split secret information generation unit 102 receives the split method information and the split number. Based on the secret information "KEY" included in the secret specification information received from the secret operation designation unit 101, the split secret information generation unit 102 generates the split number of pieces of split secret information, i.e., three pieces of split secret information K1 to K3, such that a result of a majority decision is the secret information "KEY", and outputs the generated three pieces of the split secret information K1 to K3 to the program conversion unit 106 (Step S305).

The program conversion unit 106 acquires the secret specification information from the split secret information generation unit 102, acquires the notification of the combining function from the combining function generation unit 107, and acquires the program 601 from the program acquisition unit 103. The program conversion unit 106 performs operation split processing on the acquired program 601 to generate the program 602 (Step S306), performs interleaving processing on the program 602 to generate the program 603 (Step S307), performs dummy addition processing on the program 603 to generate the program 604 (Step S308), performs combining function addition processing on the program 604 to generate the program 605 (Step S309), and outputs the program 605 to the execution program generation unit 14.

The execution program generation unit 14 acquires the program 605 that is a converted program from the program conversion unit 106, and compiles the program 605 to generate an execution program.

Second Embodiment

In the above first embodiment, processing relating to secret information, for example, the code 611 "data2=f_xor(data1, KEY);" is processing for performing a bitwise logical operation on an input argument. The logical operation includes AND (logical AND), OR (logical OR), NOT (negation), XOR (exclusive OR), a bit shift operation, and the like.

The logical operation is relatively well used in programs such as encryption algorithms. Therefore, a logical operator representing the logical operation in programs easily provides analysts with a hint to maliciously acquire secret information such as an encryption key.

If an operation in processing relating to secret information is a logical operation, the method described in the first embodiment can be used. However, if an operation in processing relating to secret information is an arithmetic operation, replacement of an operation using secret information with operations using pieces of split secret information cannot acquire a result that is the same as a result of an original program before being converted into a converted program. Therefore, in such a case, an operation needs to be converted into operations in consideration of bitwise carries and borrows that are generated in the arithmetic operation.

Here, the arithmetic operation includes "+" (addition), "−" (subtraction), "×" (multiplication), and "÷" (division), and is relatively less used in encryption algorithms. However, if such an arithmetic operation is used, an arithmetic operator representing the arithmetic operation is characteristic in the program, and therefore might provide a hint of analysis, like the logical operators.

In a second embodiment, a program including a secret operation including an arithmetic operator is converted into a converted program, in consideration of bitwise carries and borrows that are generated in an arithmetic operation.

The following describes only parts of the second embodiment that are different from the first embodiment, with reference to the drawing.

Figure 8:
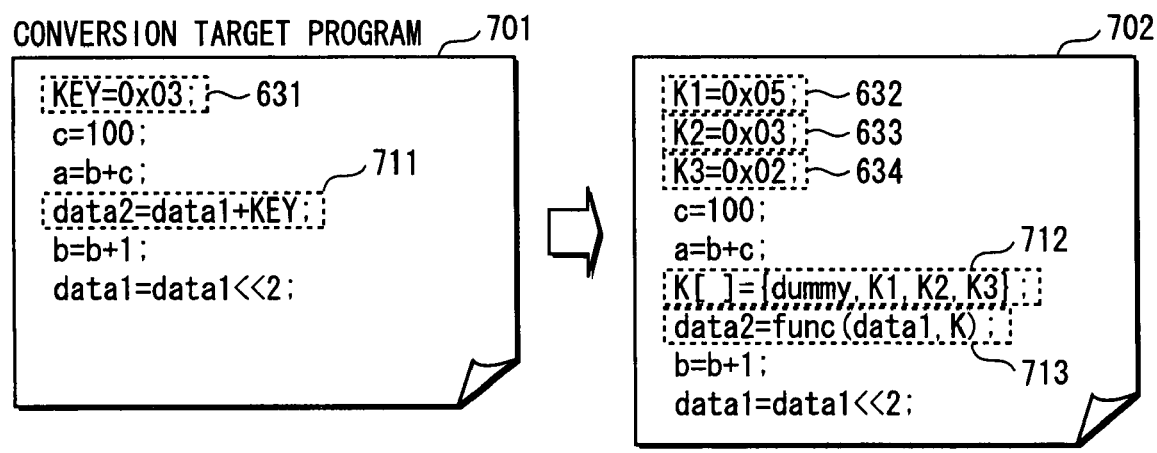
FIG. 8 shows an example of a program handled by a program conversion device of the present invention.

An execution program generation device according to the second embodiment converts a program 701 created by the user into a program 702, as shown in FIG. 8.

The program 701 is the program 601 in which the code 611 "data2=f_xor (data1, KEY);" for performing a bit wise logical operation has been replaced with a code 711 "data2=data1+KEY;" including an arithmetic operation.

The program 702 includes a code 712 "K[ ]={dummy, K1, K2, K3};" and a code 713 "data2=func(data1, K);" that are generated based on the code 711.

Each of K1, K2, and K3 included in the code 712 is a piece of split secret information generated based on the secret information KEY in the same way as in the first embodiment.

A function func(data1, K) is a function that generates data2 using a secret operation data1 to be received as an argument and a storage address of split secret information K. A function func( ) is described in detail later.

In the arithmetic operation used in the second embodiment, carries are generated. Accordingly, an appropriate operation result cannot be acquired by simply using the combining function f( ) in the same way as in the first embodiment. In view of this, the function func( ) for calculating data2 using the combining function f( ) is used in the second embodiment.

Figure 9:
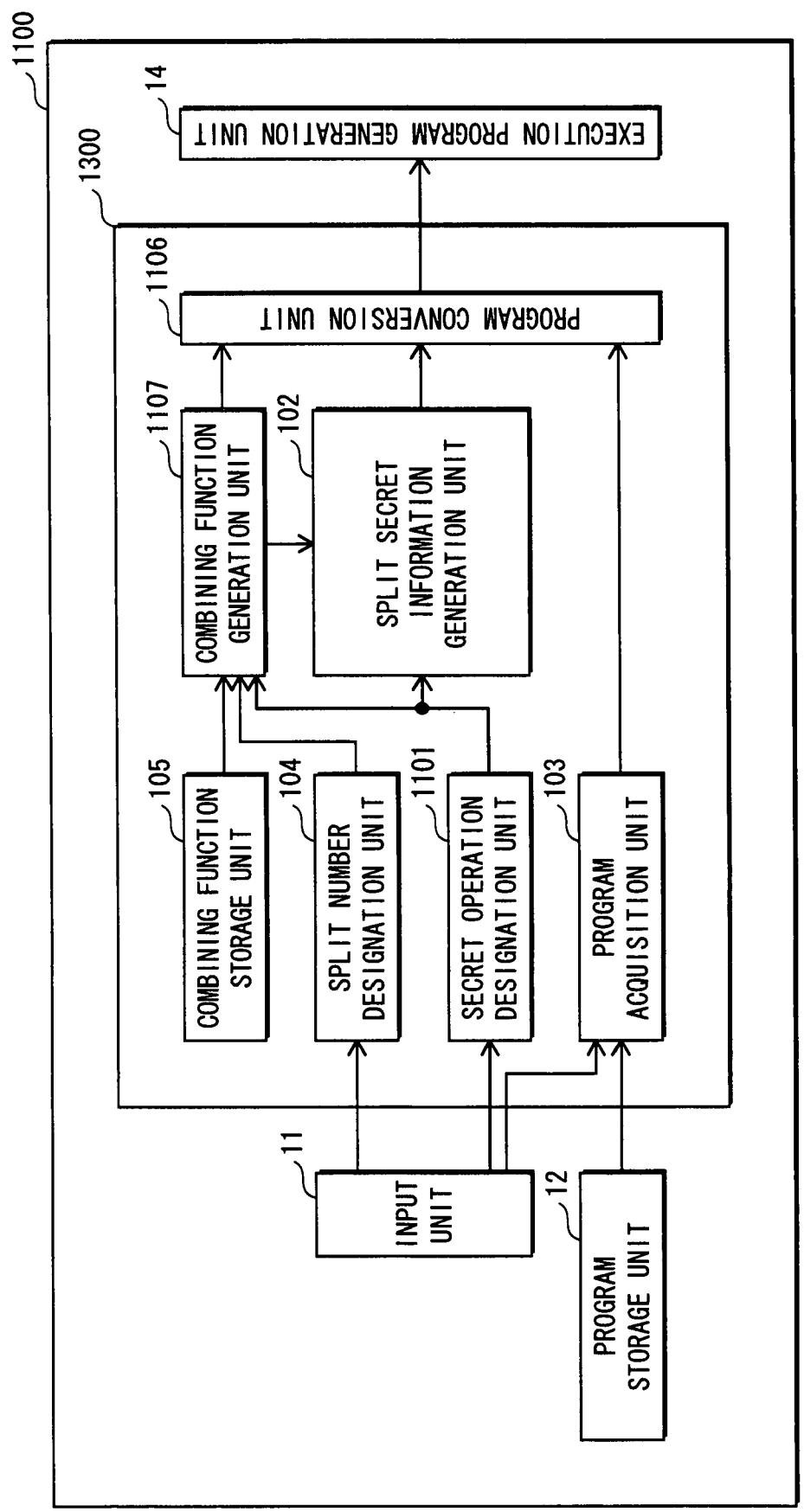
FIG. 9 is a block diagram showing an internal structure of an execution program generation device according to an embodiment of the present invention.

An execution program generation device 1100 in the second embodiment includes, as shown in FIG. 9 as an example, an input unit 11, a program storage unit 12, a converted program generation unit 1300, and an execution program generation unit 14.

The execution program generation device 1100 is specifically a computer system composed of a microprocessor, a ROM, a RAM, a hard disk unit, a display unit, a keyboard, a mouse, and so on. A computer program is stored in the RAM or the hard disk unit. Functions of the execution program generation device 1100 are achieved by the microprocessor operating in accordance with the computer program.

The input unit 11, the program storage unit 12, and the execution program generation unit 14 have been already described in the first embodiment.

The converted program generation unit 1300 converts a program created by the user into a converted program.

The converted program generation unit 1300 includes, as shown in FIG. 9, a secret operation designation unit 1101, a split secret information generation unit 102, a program acquisition unit 103, a split number designation unit 104, a combining function storage unit 105, a program conversion unit 1106, and a combining function generation unit 1107. Each of compositional elements included in the converted program generation unit 1300 that function in the same way as those included in the converted program generation unit 13 has the same reference number as that in the first embodiment, and therefore the description is omitted here.

The secret operation designation unit 1101 has the same function as that of the secret operation designation unit 101, in addition to a function that outputs generated secret specification information to not only the split secret information generation unit 102 but also the combining function generation unit 1107.

The combining function storage unit 105 stores therein the combining functions 401, 421, and 441, and the function func( ), each of which corresponding with operator information showing an operator.

For example, the combining function storage unit 105 stores therein an operator "+" and the function func( ) in correspondence with each other, stores therein an operator "−"

and the combining function 401 in correspondence with each other, stores therein the operator """ and the combining function 421 in correspondence with each other, and stores therein the operator """ and the combining function 441 in correspondence with each other.

The combining function generation unit 1107 acquires a split number from the split number designation unit 104, and acquires secret specification information from the secret operation designation unit 1101.

Next, the combining function generation unit 1107 judges whether operator information included in the acquired secret specification information shows an arithmetic operation. If the operator information shows an arithmetic operation (especially "+"), the combining function generation unit 1107 selects the function func( ) that corresponds to the arithmetic operation and the split number from the combining function storage unit 105. If the operator information shows a logical operation (especially """), the combining function generation unit 1107 selects at random anyone of the combining functions 401, 421, and 441 that each correspond to the logical operation and the split number from the combining function storage unit 105. The case where the operator information shows a logical operation has been already described in the first embodiment, and therefore the following describes a case where the operator information shows an arithmetic operation (especially "+") and the function func( ) is selected.

The combining function generation unit 1107 notifies the program conversion unit 1106 of the function func( ) as a combining function, and notifies the split secret information generation unit 102 of the secret specification information and split method information showing a split method of secret information.

The secret information is split into pieces such that the original secret information can be acquired by applying the combining function f( ) to the pieces, in the same way as in the first embodiment.

In the following description, the combining function f( ) is a function that performs a majority operation in the same way as in the first embodiment. Accordingly, split method information shows "majority decision".

Note that the combining function f( ) is not limited to the majority operation as long as the predetermined property is satisfied as well as in the first embodiment. The predetermined property is described later, and therefore its description is omitted here.

Upon receiving the secret specification information and the split method information from the combining function generation unit 1107, the split secret information generation unit 102 splits secret information included in the secret specification information into the split number of pieces of split secret information based on the split method information, as described in the first embodiment. Next, the split secret information generation unit 102 outputs the secret specification information and the pieces of the split secret information generated by splitting the secret information to the program conversion unit 1106.

The program conversion unit 1106 acquires the secret specification information and the split number of the pieces of the split secret information from the split secret information generation unit 102, acquires a notification of a combining function from the combining function generation unit 1107, acquires a program from the program acquisition unit 103, and adds the pieces of the split secret information and the combining function to the acquired program.

As a specific example, the program conversion unit 1106 acquires the program 701 from the program acquisition unit 103, and adds, to the program 701, the code 712 "K[ ]={dummy, K1, K2, K3};" and the code 713 "data2=func (data1, K);" for defining the pieces of the split secret information.

"dummy" included in the code 712 is inserted because the head of an array K [ ] is not used in the function func( ) for simplification of description, and therefore "dummy" has no meaning other than being a dummy.

(Description of Function Func( ))

The function func( ) receives data1 and a head address of the array K[ ]={dummy, K1, K2, K3} as an argument.

Figure 10:
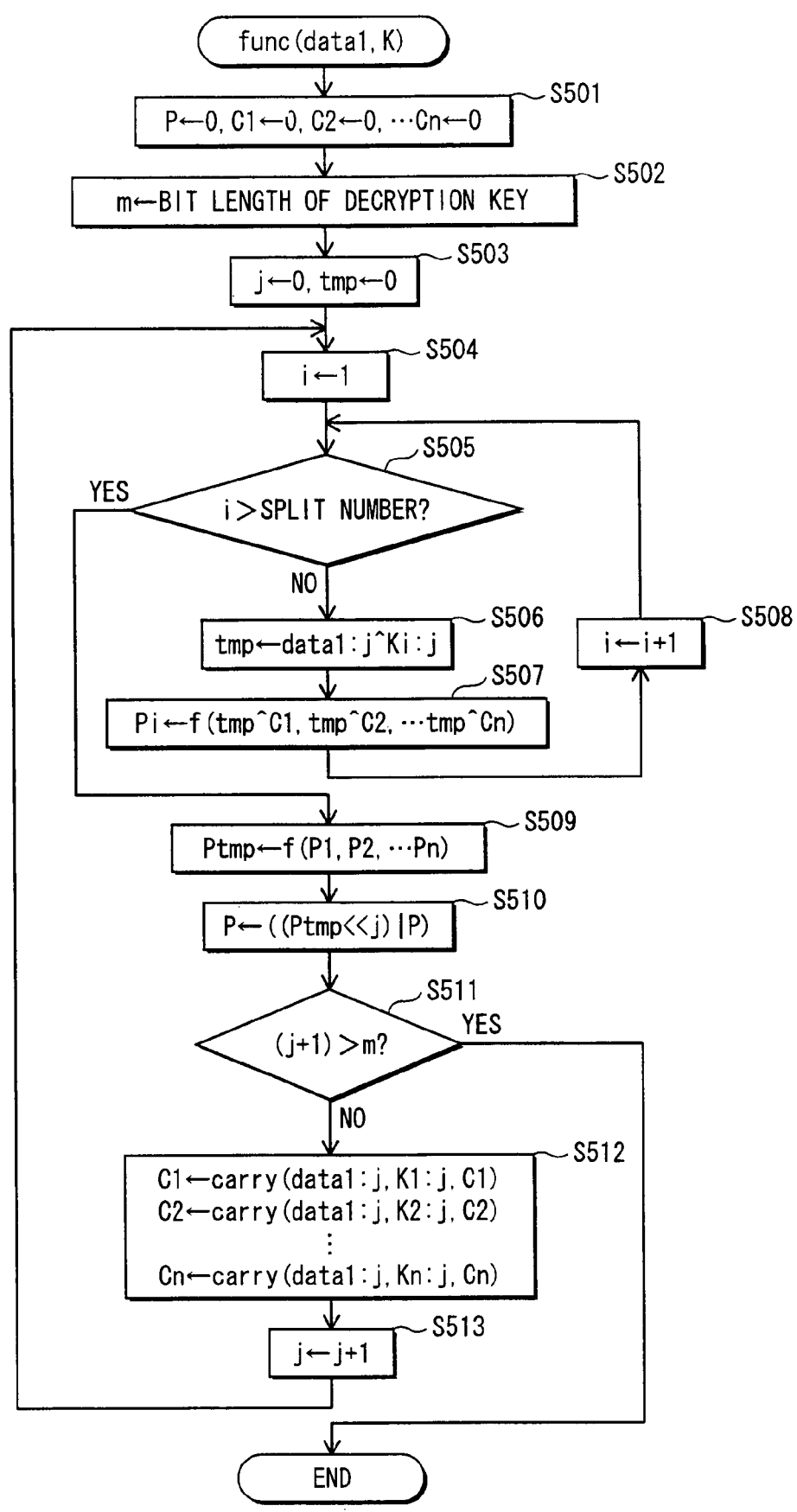
FIG. 10 is a flow chart showing a procedure of a function func( )

The following describes processing in the function func( ) with reference to FIG. 10.

First, the program conversion unit 1106 initializes P that is a return value to be finally output to 0, and initializes C1 to Cn that each represent a carry in each bit position to 0 (Step S501).

Next, the program conversion unit 1106 initializes a variable m to a bit length of a decryption key (Step S502). In the second embodiment, the decryption key KEY has a 3-bit length.

Next, the program conversion unit 1106 initializes variables j and tmp to 0, respectively (Step S503).

Then, the program conversion unit 1106 initializes a variable i to 1 (Step S504).

The program conversion unit 1106 judges whether the variable i is greater than the split number (Step S505). If the variable i is greater than the split number (Step S505: YES), the flow proceeds to Step S509 which is described later. If the variable i is not greater than the split number, the program conversion unit 1106 assigns data1:j^Ki:j to tmp (Step S506).

Here, X:j represents a bit value in a j-th bit of data X. data1:0 represents a bit value in a 0-th bit of data1. If i=1 and j=0, Ki:j represents a bit value in a 0-th bit of K1.

Next, the program conversion unit 1106 assigns a calculation result of a function f(tmp^C1, tmp^C2, . . . tmp^Cn) to Pi (Step 5507), increments the variable i by 1 (Step S508), and then the flow returns to Step S505.

If the variable i is greater than the split number (Step S505: YES), the program conversion unit 1106 calculates a function f(P1, P2, . . . Pn), assigns the calculated f(P1, P2, . . . Pn) to Ptmp (Step S509), and updates P to ((Ptmp<<j)|P) (Step S510).

Next, the program conversion unit 1106 judges whether j+1 is greater than the variable m (Step 5511). If j+1 is greater than the variable m (Step S511: YES), the program conversion unit 1106 ends the processing. If j+1 is not greater than the variable m (Step S511: NO), the program conversion unit 1106 updates the carries C1, C2, . . . Cn (Step S512).

The carries are updated using a function carry( ) by the following expressions.

$$C1 \leftarrow carry(data1{:}j, K1{:}j, C1)$$

$$C2 \leftarrow carry(data1{:}j, K2{:}j, C2)$$

$$\ldots$$

$$Cn \leftarrow carry(data1{:}j, Kn{:}j, Cn)$$

Here, a function carry (A, B, C) is a function that performs an operation to acquire a carry, which is generated when the arguments A, B, and C are added.

Specifically, if two of A, B, and C have a value "1", the function carry(A, B, C) returns a carry "1" as a return value. If two of A, B, and C have a value other than "1", the function carry (A, B, C) returns a value "0" as a return value. The above-described function that performs a majority operation may be used instead of the function carry (A, B, C).

Next, the program conversion unit 1106 increments the variable j by 1 (Step S513), and the flow proceeds to Step S505.

This completes the description of the function func( ). The following further describes the function func( ) using an example where a specific number is applied.

(Supplementary Description of Operation of Function Func( ) With Use of Example Where Specific Number is Applied)

The function func( ) receives data1 and the head address of the array K[ ]={dummy, K1, K2, K3} as an argument.

The following description uses an example where data1=0x03, KEY=0x03, K1=0x05, K2=0x03, and K3=0x02.

In accordance with the code 711 "data2=data1+KEY;", data2 should be 0x03+0x03=0x06, and therefore a return value of the function func( ) should be 0x06.

Next, the following describes the function func( ) to which a specific number is applied in a flow chart shown in FIG. 10. Note that the description of top 5 bits each whose bit value is 0 in K1, K2, and K3 is 0 is omitted here.

First, in Step 501, P=0 and C1=C2=C3=0.
In Step 502, m=3.
In Step 503, j=0 and tmp=0.
(a) Loop of j=0
(Loop on i=1)
In Step 504, i=1.
The variable i is less than the split number three, and therefore Step S505 branches to NO.
In Step S506, tmp is 0, which is an exclusive OR between 1 in bit 0 of data1 and 1 in bit 0 of K1.
In Step S507, P1=f(tmp^C1, tmp^C2, tmp^C3,)=f(0^0, 0^0, 0^0)=0.
In Step S508, i is 2.
(Loop on i=2)
The variable i is less than the split number three, and therefore Step S505 branches to NO.
In Step S506, tmp is 0, which is an exclusive OR between 1 in bit 0 of data1 and 1 in bit 0 of K2.
In Step S507, P2 is f(tmp^C1, tmp^C2, tmp^C3,)=f(0^0, 0^0, 0^0)=0.
In Step S508, i is 3.
(Loop on i=3)
The variable i is equal to the split number three, and therefore Step S505 branches to NO.
In Step S506, tmp is 1, which is an exclusive OR between 1 in bit 0 of data1 and 0 in bit 0 of K3.
In Step S507, P3 is f(tmp^C1, tmp^C2, tmp^C3,)=f(1^0, 1^0, 1^0)=1.
In Step S508, i is 4. Step S505 branches to YES, and therefore the flow proceeds to Step S509.
(Calculation of P)
In Step S509, Ptmp is f(0, 0, 1)=0.
In Step S510, P=000.
(Calculation of C1 to C3)
In Step S512, C1 is carry(1, 1, 0)=1, C2 is carry(1, 1, 0)=1, and C3 is carry(1, 0, 0)=0.
(b) Loop of j=1
(Loop on i=1)
In Step S504, i=1.
The variable i is less than the split number three, and therefore Step S505 branches to NO.
In Step S506, tmp is 1, which is an exclusive OR between 1 in bit 1 of data1 and 0 in bit 1 of K1.
In Step S507, P1 is f(tmp^C1, tmp^C2, tmp^C3,)=f(1^1, 1^1, 1^0)=0.
In Step S508, i is 2.
(Loop on i=2)

The variable i is less than the split number three, and therefore Step S505 branches to NO.
In Step S506, tmp is 0, which is an exclusive OR between 1 in bit 1 of data1 and 1 in bit 1 of K2.
In Step S507, P2 is f(tmp^C1, tmp^C2, tmp^C3,)=f(0^1, 0^1, 0^0)=1.
In Step S508, i is 3.
(Loop on i=3)
The variable i is equal to the split number three, and therefore Step S505 branches to NO.
In Step S506, tmp is 0, which is an exclusive OR between 1 in bit 1 of data1 and 1 in bit 1 of K3.
In Step S507, P3 is f(tmp^C1, tmp^C2, tmp^C3,)=f(0^1, 0^1, 0^0)=1.
In Step S508, i is 4. Step S505 branches to YES, and therefore the flow proceeds to Step S509.
(Calculation of P)
In Step S509, Ptmp is f(0, 1, 1)=1.
In Step S510, P is 010.
(Calculation of C1 to C3)
In Step S512, C1 is carry(1, 0, 1)=1, C2 is carry(1, 1, 1)=1, and C3 is carry (1, 1, 0)=1.
(c) Loop of j=2
(Loop on i=1)
In Step S504, i=1.
The variable i is less than the split number three, and therefore Step S505 branches to NO.
In Step S506, tmp is 1, which is an exclusive OR between 0 in bit 2 of data1 and 1 in bit 2 of K1.
In Step S507, P1=f(tmp^C1, tmp^C2, tmp^C3,)=f(1^1, 1^1, 1^1)=0.
In Step S508, i=2.
(Loop on i=2)
The variable i is less than the split number three, and therefore Step S505 branches to NO.
In Step S506, tmp is 0, which is an exclusive OR between 0 in bit 2 of data1 and 0 in bit 2 of K2.
In Step S507, P2 is f(tmp^C1, tmp^C2, tmp^C3,)=f(0^1, 0^1, 0^1)=1.
In Step S508, i is 3.
(Loop on i=3)
The variable i is equal to the split number three, and therefore Step S505 branches to NO.
In Step S506, tmp is 0, which is an exclusive OR between 0 in bit 2 of data1 and 0 in bit 2 of K3.
In Step S507, P3 is f(tmp^C1, tmp^C2, tmp^C3,)=f(0^1, 0^1, 0^1)=1.
In Step S508, i is 4. Step S505 branches to YES, and therefore the flow proceeds to Step S509.
(Calculation of P)
In Step S509, Ptmp is f(0, 1, 1)=1.
In Step S510, P is 0x06.
In accordance with the judgment in Step S511, the program conversion unit 1106 ends the processing.

<Necessary and Sufficient Condition that Combining Function f( ) Needs to Satisfy>

The combining function f( ) needs to satisfy the following three conditions in order to acquire an operation result using pieces of split secret information and the combining function f( ) by the method described in the first and second embodiments, the operation result being the same as an operation result acquirable using secret information.

$f(0, 0, \ldots, 0) = 0$ (Condition 1)

$f(1, 1, \ldots, 1) = 1$ (Condition 2)

$\sim f(x1, x2, \ldots, xn) = f(\sim x1, x2, \ldots, \sim xn)$ (Condition 3)

(Note that a sign "~" is a logical operation that represents negation.)

The following describes in more detail the above conditions that the function f( ) needs to satisfy.

(Condition 1) represents that if all the input values are 0, an output value of f( ) is also 0, as shown by the expression. (Condition 2) represents that if all the input values are 1, an output value of f( ) is also 1, as shown by the expression.

Also, (Condition 3) is a condition of a generally called self-dual function, and represents that if all the values given to the function f( ) are negated (NOT), an output is negation (NOT) of an output value corresponding to an original input value by f( ).

There are 2 to the power of x combinations (where, x is 2 to the power of (n−1)−1) (where, n is a split number) to determine the function f( ) that satisfies such conditions, in addition to the functions shown in FIG. 4 and FIG. 5.

A plurality of functions that satisfy these conditions are stored in the combining function storage unit 105, and a combining function is changed for each piece of secret information. This can make analysis more difficult.

Furthermore, in the second embodiment, the combining function storage unit 105 prestores therein a plurality of functions, and the combining function generation unit 107 designates a combining function from among the plurality of the functions. Alternatively, a program may be changed without prestoring combining functions in the combining function storage unit 105, in the following way. The combining function generation unit 107 generates the function f( ) that satisfies (Condition 1) to (Condition 3) each time, and generates a combining function that applies the function f( ) to a bit value in each bit position of input arguments.

For example, the function f( ) that satisfies (Condition 1) to (Condition 3) can be generated in the following way.

A truth table is prepared, which includes entries of all patterns of a value of arguments that the function f( ) may have. Firstly, since the function f( ) satisfies (Condition 1) and (Condition 2), 0 is assigned to an entry in which all the arguments are 0, and 1 is assigned to an entry in which all the arguments are 1.

Then, a value 0 or 1 is assigned at random to other entries, and a negation of the assigned value is assigned to an entry of an argument that negates arguments of the other entries.

As a specific example, in a case where there are three arguments, if "1" is assigned to an entry of "0, 1, 1", "0" is assigned to an entry of "1, 0, 0".

By repeating the above processing until any value has been assigned to all the entries, a truth table of the function that satisfies (Condition 1) to (Condition 3) completes.

Then, a logical expression is generated using a known method based on the truth table. The function f( ) can be acquired, by generating a function that performs an operation shown by the logical expression or generating a function in which the generated truth table is referred to.

Also, by implementing the function f( ) so as to be executed in a tamper-resistant environment, analysis can be made more difficult. Specifically, various methods are applicable, such as a method of executing a function( ) using a special hardware and a method of executing the function f in an environment isolated from normal programs. Furthermore, if the function f is implemented by software, obfuscation methods may be used for obfuscating the program by adding dummy processing using a dummy variable for making generally known programs difficult to be read, adding branch processing to the program, and the like.

Note that, in the second embodiment, the processing for adding K1 to K3 to data1 and the processing for combining the addition results are performed using the function func( ) at a time. However, the present invention is not limited to this.

That is, the following may be employed in the same way as in the first embodiment. First, operation results of data1+K1, data1+K2, and data1+K3 are calculated, and these operation results are combined using a function func2( ) that combine these operation results with a carry.

<Supplementary Description>

While the present invention has been described based on the above embodiments, the present invention is by no means limited to the above embodiments. The present invention also includes the following cases.

(1) The above embodiments have been described using the sign "^" as a logical operator. Alternatively, another logical operators that perform logical operations may be employed.

For example, the logical operator includes AND (logical AND), OR (logical OR), NOT (negation), XOR (exclusive OR), a bit shift operation, and the like. A logical operation represented by the logical operator is relatively well used in programs such as encryption algorithms. Therefore, such logical operator in programs easily provides analysts with a hint to acquire secret information such as an encryption key.

Also, the above embodiments have been described using the sign "+" as an arithmetic operator. The present invention is not limited to this, and another arithmetic operators may be employed.

The arithmetic operator includes "−" (subtraction), "×" (multiplication), and "÷" (division), as well as "+" (addition), and is relatively less used in encryption algorithms. However, if such an arithmetic operator is used, the arithmetic operator is characteristic in the program, and therefore might provide a hint of analysis, like the logical operators.

Note that, in a case of not addition but subtraction, a borrow is generated instead of a carry. Therefore, processing for acquiring a calculation result with a borrow needs to be performed in the second embodiment in the same way as the processing for acquiring a calculation result with a carry.

(2) The split number designation unit 104 acquires a split number input by a user operation via the input unit 11. Alternatively, the split number may be acquired using another methods. For example, a split number may be prestored in a nonvolatile memory and the like, and the prestored split number may be read and used.

(3) The split secret information generation unit 102 may generate pieces of split secret information using another methods.

For example, the following may be employed. A truth table, for example, the truth table 402 is prepared beforehand. The truth table 402 is searched for an entry corresponding to secret information before being split, and x, y, and z each corresponding to the entry are output as pieces of split secret information.

(4) The interleaving processing is not essential in the present invention, and therefore may be omitted. Also, the interleaving processing may be added to the second embodiment.

(5) Dummy codes in the dummy addition processing may be created by newly adding a variable as long as the processing has no influence on an execution result of the program, or by using a variable that has existed originally in the program. Also, the dummy addition processing may be used for increasing the effect of the interleaving processing by adding the dummy operation processing to the program, such that positions of pieces of split secret information are scattered by combining the dummy addition processing and the interleaving processing.

As described above, by adding the dummy operation processing that has no influence on the execution result of the program, analysis of an operation of split secret information is made to be more difficult. However, the addition of the dummy operation processing is not essential in the present invention.

(6) The split method for splitting secret information into pieces of split secret information is not limited to the split method such that secret information that is a restoration result of the program is acquired by a majority decision of the pieces of the split secret information.

Another split methods may be employed as long as a result of an operation using secret information before being split is the same as a result of an operation using pieces of split secret information.

(7) In the second embodiment, the code 711 "data2=data1+KEY;" is replaced with the code 713 "data2=func(data1, K)". However, the present invention is not limited to this.

As described above, the function func( ) is composed of a plurality of steps. Therefore, as long as an operation result is maintained to be the same, the interleaving processing, the dummy addition processing, and the combining function addition processing that are performed in the first embodiment may be performed in each step of the function func( ).

(8) As a combining function that combines a plurality of pieces of split secret information, a selected combining function has been described as an example. However, the present invention is not limited to this.

For example, a combining function to be used may be changed for each bit position or each plurality of positions of pieces of split secret information.

Also, in the first and second embodiments, a value of each piece of split secret information is determined 1-bit by 1-bit. However, the present invention is not limited to this.

For example, a value of each argument may be determined by reverse look-up of the truth table with reference to operation results of the combining function f( ). Specifically, if KEY is 1, a line in which a value of f(x, y, z) in the truth table 402 is 1 is selected at random, and each value of x, y, and z corresponding to the selected line is allocated to each piece of the split secret information. If KEY is 0, processing is performed in the same way.

(9) In the first and second embodiments, the execution program generation devices have been described. Also, the present invention includes a characteristic program generated by these devices and an information processing execution device in which each part of the program is realized by hardware.

Figure 11:
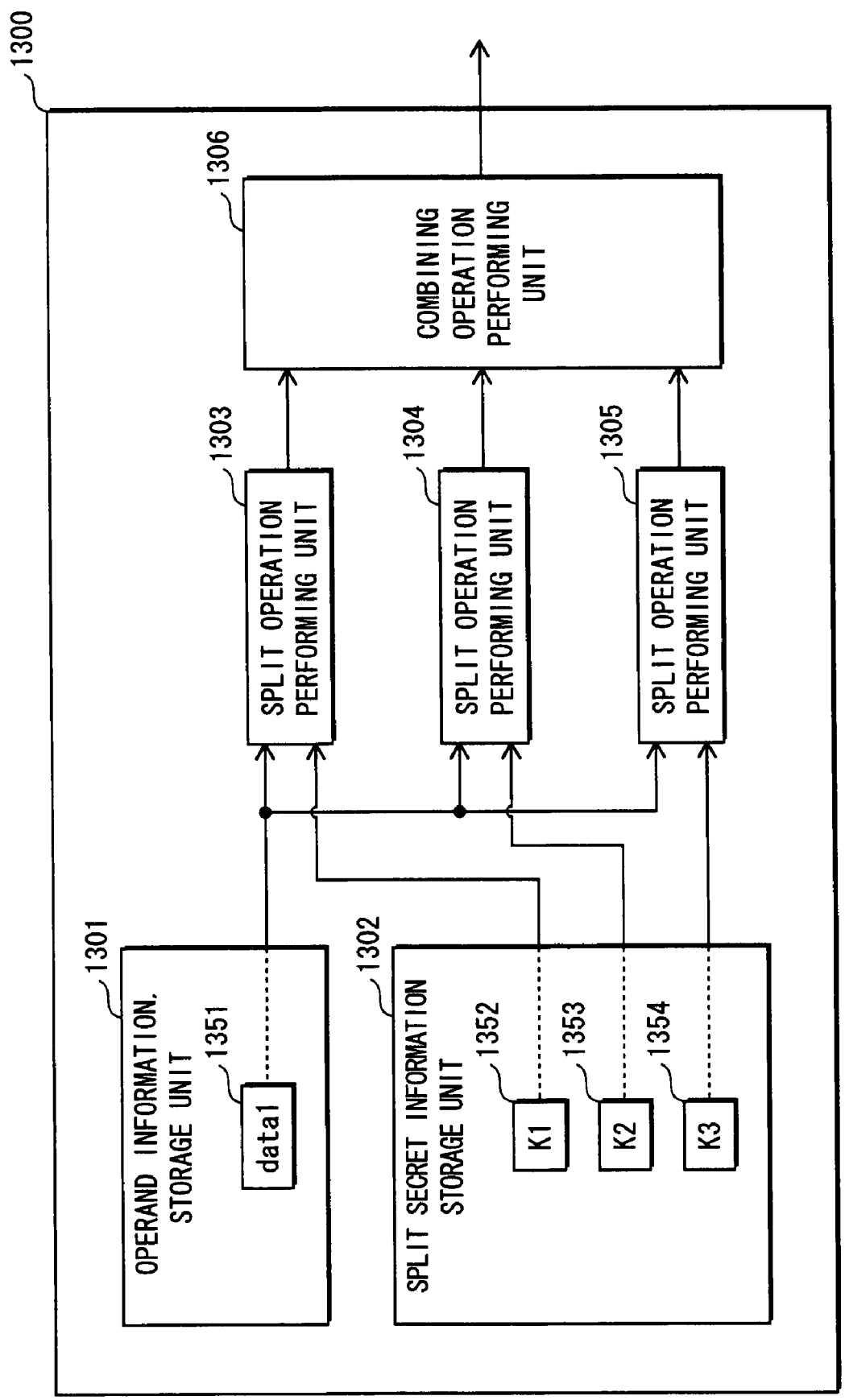
FIG. 11 is a block diagram showing a structure of an information processing execution device according to a modification.

For example, an information processing execution device 1300 is composed of the execution program that the program 605 shown in FIG. 1 has been converted into executable is realized by hardware. The information processing execution device 1300 includes, as shown in FIG. 11, an operand information storage unit 1301, a split secret information storage unit 1302, split secret operation performing units 1303 to 1305, and a combining operation performing unit 1306.

The operand information storage unit 1301 stores therein data1 (1151) as operand information. Here, the operand information may be acquired from outside of the information processing execution device 1300.

The split secret information storage unit 1302 stores therein K1 (1352), K2 (1353), and K3 (1354), as the split number of pieces of split secret information into which secret information is split. K1, K2, and K3 correspond to K1 (632), K2 (633), and K3 (634) included in the program 605, respectively.

The split secret operation performing unit 1303 acquires data1 (1351) from the operand information storage unit 1301, acquires K1 (1352) from the split secret information storage unit 1302, executes P1=f_xor(data1, K1), and outputs P1 to the combining operation performing unit 1306.

In the same way as the split secret operation performing unit 1303 performs, the split secret operation performing unit 1304 acquires data1 (1351) from the operand information storage unit 1301, acquires K2 (1353) from the split secret information storage unit 1302, executes P2=f_xor(data1, K2), and outputs P2 to the combining operation performing unit 1306.

Also, the split secret operation performing unit 1305 acquires data1 (1351) from the operand information storage unit 1301, acquires K3 (1354) from the split secret information storage unit 1302, executes P3=f_xor(data1, K3), and outputs P3 to the combining operation performing unit 1306.

The number of the split secret operation performing units is the same as the split number relating to secret information.

In the modification, the secret information KEY is split into the split number three pieces of split secret information K1, K2, and K3, as well as an the above embodiments. Accordingly, the information processing execution device 1300 includes three split secret operation performing units 1302 to 1305.

The combining operation performing unit 1306 acquires P1 from the split secret operation performing unit 1303, acquires P2 from the split secret operation performing unit 1304, acquires P3 from the split secret operation performing unit 1305, executes data2=f_major (P1, P2, P3), and outputs data2 to the combining operation performing unit 1306.

(10) In the second embodiment, the function func( ) is stored in the combining function storage unit 105. However, the present invention is not limited to this. The following may be employed. The combining function f( ) is stored in the combining function storage unit 105, and the combining function generation unit 1107 generates the function func( ) using the combining function f( ) acquired from the combining function storage unit 105.

Furthermore, in this case, the combining function f( ) may be selected from among the combining functions 401, 421, 441, and the like, as long as the above-described three properties are satisfied.

(11) In the first and second embodiments, pieces of split secret information are generated at random. However, the present invention is not limited to this. The following may be employed. For example, a piece of split secret information having the same value as secret information before being split is excluded, and then remaining pieces of the split secret information are selected at random. This prevents the secret information from being exposed in the memory. Therefore, the secret information can be protected more securely.

(12) In the above embodiments, the description uses an example where an original program is converted into a program having an execution result that is the same as an execution result of the original program, the converted program is compiled into an execution program, and the execution program is executed. However, the present invention is not limited to this. The program may be executed using another methods as long as the program can be executed on the computer. For example, the following may be employed. An original program is converted into another program having an execution result that is the same as an execution result of the original program, and the converted program is converted into an intermediate code that is interpretable by an interpreter. The intermediate code is executed on the interpreter.

(13) Each of the above devices is specifically a computer system composed of a microprocessor, a ROM, a RAM, a hard disk unit, a display unit, a keyboard, a mouse, and so on. A computer program is stored in the RAM or the hard disk unit. Functions of each of the devices are achieved by the microprocessor operating in accordance with the computer program. Here, the computer program is composed of a plurality of instruction codes that show instructions to the computer, in order to achieve predetermined functions.

(14) All or part of compositional elements of each of the above devices may be composed of one system LSI (Large Scale Integration). The system LSI is a super-multifunctional LSI manufactured by integrating a plurality of compositional units on one chip, and is specifically a computer system composed of a microprocessor, a ROM, a RAM, and so on. A computer program is stored in the RAM. Functions of the system LSI are achieved by the microprocessor operating in accordance with the computer program. The system LSI may be manufactured by separately integrating the plurality of compositional units into one chip, or by integrating the plurality of compositional units into one chip including all or part of the functions.

Here, the LSI may be called an IC, a system LSI, a super LSI, and an ultra LSI, depending on integration degree.

Also, a method of forming integrated circuits is not limited to LSIs, and may be realized using a dedicated circuit or a general-purpose processor. Furthermore, an FPGA (Field Programmable Gate Array) that is programmable after manufacturing LSIs and a reconfigurable processor that can reconfigure connection and setting of circuit cells inside LSIs may be used.

Furthermore, when new technology for forming integrated circuits that replaces LSIs becomes available as a result of progress in semiconductor technology or semiconductor-derived technologies, functional blocks may be integrated using such technology. One possibility lies in adaptation of biotechnology.

(15) All or part of the compositional elements of each of the above devices may be composed of a removable IC card or a single module. The IC card or the single module is a computer system composed of a microprocessor, a ROM, a RAM, and so on. The IC card or the module may include the above-described super-multifunctional LSI. Functions of the IC card or the module are achieved by the microprocessor operating in accordance with the computer program. The IC card or the module may be tamper-resistant.

(16) The present invention may be the above methods. Also, the present invention may be a computer program that realizes the methods by a computer, or a digital signal composed of the computer program.

Furthermore, the present invention may be a computer-readable storage medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored in the storage medium.

Furthermore, the present invention may be the computer program or the digital signal transmitted via an electric communication network, a wireless or wired communication network, a network such as Internet, data broadcasting, and so on.

Furthermore, the present invention may be a computer system that includes a microprocessor and a memory, the memory storing the computer program, and the microprocessor operating in accordance with the computer program.

Furthermore, the program or the digital signal may be executed by other independent computer system, by transferring the program or the digital signal to the recording medium, or by transferring the program or the digital signal via a network or the like.

(17) The present invention may be any combination of the above-described embodiment and modifications.

INDUSTRIAL APPLICABILITY

The program conversion device according to the present invention generates a program for a player that decrypts encrypted contents and plays back the contents, and is used in the contents industry that manufactures and distributes contents.

The invention claimed is:

1. A program conversion device comprising:
a program storage unit operable to store therein an original program that includes a secret operation instruction to perform a secret operation, using a secret key, on operand information;
a split secret key generation unit operable to generate split secret keys based on the secret key and a predetermined combining operation, such that the secret key is acquired by performing the predetermined combining operation on the split secret keys;
a split secret operation instruction generation unit operable to generate a split secret operation instruction for each of the split secret keys, each of the split secret operation instructions performing a split secret operation using a corresponding one of the split secret keys and the operand information;
a combining instruction generation unit operable to generate a combining instruction to combine results of the split secret operation using the predetermined combining operation, such that a result that is the same as a result of the secret operation is acquired; and
a replacement unit operable to replace the secret operation instruction included in the original program with the split secret operation instructions and the combining instruction,
wherein the predetermined combining operation is a bitwise operation f using a self-dual function, the bitwise operation f satisfying the following conditions:
(i) $\sim f(x1, x2, \ldots, xn) = f(\sim x1, \sim x2, \ldots, \sim xn)$;
(ii) $f(0, 0, \ldots, 0) = 0$; and
(iii) $f(1, 1, \ldots, 1) = 1$,
where values x1 to xn are each a bitwise value, and a sign "~" is a logical operation that represents negation;
wherein the split secret operation is performed between each bit value of the operand information and a corresponding bit value of a different piece of the split secret information that is in the same bit position as the bit value of the operand information.

2. The program conversion device of claim 1,
wherein the secret operation is a bitwise logical operation,
wherein the split secret operation is the same as the secret operation, and
wherein the combining instruction is an instruction to perform an operation that is the same as the predetermined combining operation.

3. The program conversion device of claim 1,
wherein the secret operation is performed between each bit value of the operand information and a corresponding bit value of the secret key that is in the same bit position as the bit value of the operand information, wherein the split secret key generation unit generates, for each bit value of the secret key, bit values that are results of an inverse operation of the self-dual function applied to the bit value, and allocates each of the generated bit values to a same bit position of one of the split secret keys in one to one correspondence, and wherein the combining instruction is an instruction to apply the self-dual function to bit values that are results of the split secret operation so as to acquire bit values as results of the combining operation for each bit position.

4. The program conversion device of claim 1,
wherein the self-dual function is a majority function that outputs, from among a plurality of input values, an input value that is in a majority of the plurality of the input values, wherein the split secret key generation unit prestores therein a correspondence table between input values related to the self-dual function and an output value, wherein the split secret key generation unit reads, for each bit position of the secret key, input values corresponding to an output value that is the same as a bit value in the bit position of the secret key from the correspondence table, and wherein the split secret key generation unit allocates each of the read input values to one of the split secret keys in a same bit position in one to one correspondence.

5. The program conversion device of claim 1, further comprising
an operation storage unit that stores therein a plurality of different self-dual functions, wherein the split secret key generation unit performs, as the predetermined combining operation, at-random selection of one of the self-dual functions stored in the operation storage unit.

6. The program conversion device of claim 1,
wherein the replacement unit further rearranges locations of the split secret operation instructions and the combining instruction without having influence on an execution result of the program.

7. The program conversion device of claim 6,
wherein the replacement unit further scatters the rearranged locations of the split secret operation instructions and the combining instruction without having influence on the execution result of the program.

8. The program conversion device of claim 6,
wherein the replacement unit further adds a dummy operation instruction to the program without having influence on the execution result of the program.

9. A program conversion method for converting an original program that includes a secret operation instruction to perform a secret operation, using a secret key, on operand information, the program conversion method comprising:

a split secret key generation step for generating split secret keys based on the secret key and a predetermined combining operation, such that the secret key is acquired by performing the predetermined combining operation on the split secret keys;

a split secret operation instruction generation step for generating a split secret operation instruction for each of the split secret keys, each of the split secret operation instructions performing a split secret operation using a corresponding one of the split secret keys and the operand information;

a combining instruction generation step for generating a combining instruction to combine results of the split secret operation using the predetermined combining operation, such that a result that is the same as a result of the secret operation is acquired; and a replacement step for replacing the secret operation instruction included in the original program with the split secret operation instructions and the combining instruction, wherein the predetermined combining operation is a bitwise operation f using a self-dual function, the bitwise operation f satisfying the following conditions:
(i) $\sim f(x1, x2, \ldots xn) = f(\sim x1, \sim x2, \ldots, \sim xn)$;
(ii) $f(0, 0, \ldots, 0) = 0$; and
(iii) $f(1, 1, \ldots, 1) = 1$,
where values x1 to xn are each a bitwise value, and a sign "$\sim$" is a logical operation that represents negation;

wherein the split secret operation is performed between each bit value of the operand information and a corresponding bit value of a different piece of the split secret information that is in the same bit position as the bit value of the operand information.

10. An integrated circuit for use in a program conversion device for converting an original program that includes a secret operation instruction to perform a secret operation, using a secret key, on operand information, the integrated circuit comprising:

a processor;
a split secret key generation unit operable to generate, using the processor, split secret keys based on the secret key and a predetermined combining operation, such that the secret key is acquired by performing the predetermined combining operation on the split secret keys;

a split secret operation instruction generation unit operable to generate a split secret operation instruction for each of the split secret keys, each of the split secret operation instructions performing a split secret operation using a corresponding one of the split secret keys and the operand information;

a combining instruction generation unit operable to generate a combining instruction to combine results of the split secret operation using the predetermined combining operation, such that a result that is the same as a result of the secret operation is acquired; and a replacement unit operable to replace the secret operation instruction included in the original program with the split secret operation instructions and the combining instruction, wherein the predetermined combining operation is a bitwise operation f using a self-dual function, the bitwise operation f satisfying the following conditions:
(i) $\sim f(x1, x2, \ldots, xn) = f(\sim x1, \sim x2, \ldots, \sim xn)$;
(ii) $f(0, 0, \ldots, 0) = 0$; and
(iii) $f(1, 1, \ldots, 1) = 1$,
where values x1 to xn are each a bitwise value, and a sign "$\sim$" is a logical operation that represents negation;

wherein the split secret operation is performed between each bit value of the operand information and a corresponding bit value of a different piece of the split secret information that is in the same bit position as the bit value of the operand information.

11. A non-transitory computer readable recording medium having stored thereon a computer program for use in a program conversion device for converting an original program that includes a secret operation instruction to perform a secret operation, using a secret key, on operand information, wherein when executed, the computer program causes the program conversion device to perform a method comprising:

a split secret key generation step for generating split secret keys based on the secret key and a predetermined combining operation, such that the secret key is acquired by performing the predetermined combining operation on the split secret keys;

a split secret operation instruction generation step for generating a split secret operation instruction for each of the split secret keys, each of the split secret operation instructions performing a split secret operation using a corresponding one of the split secret information keys and the operand information;

a combining instruction generation step for generating a combining instruction to combine results of the split secret operation using the predetermined combining operation, such that a result that is the same as a result of the secret operation is acquired; and a replacement step for replacing the secret operation instruction included in the original program with the split secret operation instructions and the combining instruction, wherein the predetermined combining operation is a bitwise operation f using a self-dual function, the bitwise operation f satisfying the following conditions:

(i) $\sim f(x1, x2, \ldots, xn) = f(\sim x1, \sim x2, \ldots, \sim xn)$;
(ii) $f(0, 0, \ldots, 0) = 0$; and
(iii) $f(1, 1, \ldots, 1) = 1$, where values x1 to xn are each a bitwise value, and a sign "~" is a logical operation that represents negation;

wherein the split secret operation is performed between each bit value of the operand information and a corresponding bit value of a different piece of the split secret information that is in the same bit position as the bit value of the operand information.

12. A secure processing device comprising:

an operand information storage unit operable to store therein operand information;

a split secret information storage unit operable to store therein split secret keys;

a combining operation expression storage unit operable to store therein a combining operation expression showing a combining operation for combining the split secret keys;

a split secret operation unit operable to perform, for each of the split secret keys, a split secret operation as a first operation on the operand information using the split secret key; and a combining unit operable to combine results of the split secret operation using the combining operation, wherein the split secret operation is performed between each bit value of the operand information and a corresponding bit value of a different piece of the split secret information that is in the same bit position as the bit value of the operand information, and wherein the combining unit combines the results of the split secret operation using the combining operation, such that a result as a combination of the results is the same as a result of a second operation performed on the operand information using a secret key, and such that the secret key is acquired by combining the split secret keys using the combining operation, wherein the combining operation is a bitwise operation f using a self-dual function, the bitwise operation f satisfying the following conditions:

(i) $\sim f(x1, x2, \ldots, xn) = f(\sim x1, \sim x2, \ldots, \sim xn)$;
(ii) $f(0, 0, \ldots, 0) = 0$; and
(iii) $f(1, 1, \ldots, 1) = 1$, where values x1 to xn are each a bitwise value, and a sign "~" is a logical operation that represents negation.

13. The secure processing device of claim 12, wherein the first operation is the same as the second operation.

14. A non-transitory computer readable recording medium having stored thereon a computer program that includes operand information, split secret keys, and a combining operation expression for combining the split secret keys, wherein when executed, the computer program performs a method comprising:

a split secret operation step for performing, for each of the split secret keys, a split secret operation as a first operation on the operand information using the split secret keys; and a combining step for combining results of the split secret operation using the combining operation expression, wherein the split secret operation is performed between each bit value of the operand information and a corresponding bit value of a different piece of the split secret information that is in the same bit position as the bit value of the operand information, and wherein, in the combining step, the results of the split secret operation are combined using the combining operation expression, such that a result as a combination of the results is the same as a result of a second operation performed on the operand information using a secret key, and such that the secret key is acquired by combining the split secret keys using the combining operation expression, wherein the combining operation expression is a bitwise operation f using a self-dual function, the bitwise operation f satisfying the following conditions:

(i) $\sim f(x1, x2, \ldots, xn) = f(\sim x1, \sim x2, \ldots, \sim xn)$;
(ii) $f(0, 0, \ldots, 0) = 0$; and
(iii) $f(1, 1, \ldots, 1) = 1$, where values x1 to xn are each a bitwise value, and a sign "~" is a logical operation that represents negation.

15. The non-transitory computer readable recording medium of claim 14, wherein the first operation is the same as the second operation.

* * * * *